United States Patent
Oshima et al.

(10) Patent No.: US 10,055,980 B2
(45) Date of Patent: Aug. 21, 2018

(54) OPERATING MANAGEMENT SYSTEM, OPERATING MANAGEMENT METHOD, AND PROGRAM

(71) Applicant: MITSUBISHI HEAVY INDUSTRIES MECHATRONICS SYSTEMS, LTD., Kobe-shi, Hyogo (JP)

(72) Inventors: Kyoko Oshima, Tokyo (JP); Ryota Hiura, Tokyo (JP); Masaaki Sato, Yokohama (JP); Kazunori Sugiura, Yokohama (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/914,976

(22) PCT Filed: Aug. 27, 2014

(86) PCT No.: PCT/JP2014/072470
§ 371 (c)(1),
(2) Date: Feb. 26, 2016

(87) PCT Pub. No.: WO2015/030068
PCT Pub. Date: Mar. 5, 2015

(65) Prior Publication Data
US 2016/0210851 A1 Jul. 21, 2016

(30) Foreign Application Priority Data
Aug. 30, 2013 (JP) .................................. 2013-180015

(51) Int. Cl.
*G08G 1/01* (2006.01)
*G08G 1/13* (2006.01)
(Continued)

(52) U.S. Cl.
CPC ......... *G08G 1/0125* (2013.01); *G08G 1/0112* (2013.01); *G08G 1/0133* (2013.01);
(Continued)

(58) Field of Classification Search
CPC .......................... G08G 1/0125; G08G 1/0112
(Continued)

(56) References Cited

U.S. PATENT DOCUMENTS

| | | | | |
|---|---|---|---|---|
| 5,928,294 A | * | 7/1999 | Zelinkovsky | G05D 1/0265 180/168 |
| 2012/0072051 A1 | * | 3/2012 | Koon | G05D 1/0278 701/2 |

(Continued)

FOREIGN PATENT DOCUMENTS

| | | |
|---|---|---|
| JP | H07-220192 A | 8/1995 |
| JP | H08-076706 A | 3/1996 |

(Continued)

OTHER PUBLICATIONS

EPO English JP-2002150468-A.*
(Continued)

*Primary Examiner* — Yazan A Soofi
(74) *Attorney, Agent, or Firm* — Manabu Kanesaka; Benjamin Hauptman; Kenneth Berner

(57) ABSTRACT

There is provided an operating management system including: on-board units (100) that are each mounted on a plurality of vehicles (1a, 1b, . . . ) and are configured to be capable of acquiring travel information which includes positional information of the vehicles (1a, 1b, . . . ); and an operating management apparatus (600) that includes a travel-information acquisition unit which acquires the travel information from the on-board units (100) of the plurality of vehicles (1a, 1b, . . . ) and an evaluation unit which evaluates driving of the vehicles (1a, 1b, . . . ), based on relative operating states, for the plurality of vehicles (1a, 1b, . . . ) specified based on the travel information.

11 Claims, 19 Drawing Sheets

(51) Int. Cl.
*G08G 1/00* (2006.01)
*G08G 1/0967* (2006.01)

(52) U.S. Cl.
CPC ..... *G08G 1/0145* (2013.01); *G08G 1/096716* (2013.01); *G08G 1/096741* (2013.01); *G08G 1/096775* (2013.01); *G08G 1/13* (2013.01); *G08G 1/20* (2013.01)

(58) Field of Classification Search
USPC ........................................................ 701/117
See application file for complete search history.

(56) References Cited

U.S. PATENT DOCUMENTS

| | | | | |
|---|---|---|---|---|
| 2015/0251676 | A1* | 9/2015 | Golden | B61L 15/0027 701/19 |
| 2016/0379486 | A1* | 12/2016 | Taylor | G08G 1/0141 340/905 |

FOREIGN PATENT DOCUMENTS

| | | | | |
|---|---|---|---|---|
| JP | 2002-150468 | A | | 5/2002 |
| JP | 2002150468 | A | * | 5/2002 |
| JP | 2004-347952 | A | | 12/2004 |
| JP | 2005-222144 | A | | 8/2005 |
| JP | 4427203 | B2 | | 3/2010 |
| JP | 2010-113365 | A | | 5/2010 |
| JP | 2011-096086 | A | | 5/2011 |
| JP | 2011-197947 | A | | 10/2011 |
| JP | 2012-078305 | A | | 4/2012 |
| JP | 2012-088871 | A | | 5/2012 |
| JP | 2013-114319 | A | | 6/2013 |

OTHER PUBLICATIONS

PCT/ISA/210, "International Search Report for International Application No. PCT/JP2014/072470," dated Dec. 2, 2014.

PCT/ISA/237, "Written Opinion of the International Searching Authority for International Application No. PCT/JP2014/072470," dated Dec. 2, 2014.

* cited by examiner

FIG. 5

<EVALUATION TABLE>

| VEHICLE NUMBER | EVALUATION SCORE |
|---|---|
| CAR 1 (VEHICLE 1a) | −5 |
| CAR 2 (VEHICLE 1b) | −5 |
| CAR 3 (VEHICLE 1c) | 0 |
| ⋮ | ⋮ |

OPERATING MANAGEMENT SYSTEM, OPERATING MANAGEMENT METHOD, AND PROGRAM

RELATED APPLICATIONS

The present application is National Phase of International Application No. PCT/JP2014/072470 filed Aug. 27, 2014, and claims priority from Japanese Application No. 2013-180015, filed Aug. 30, 2013, the disclosure of which is hereby incorporated by reference herein in its entirety.

TECHNICAL FIELD

The present invention relates to an operating management system, an operating management method, and a program which manage operating states of a plurality of vehicles.

Priority is claimed on Japanese Patent Application NO. 2013-180015, filed Aug. 30, 2013, the content of which is incorporated herein by reference.

BACKGROUND ART

An operating evaluation system, which evaluates a driver based on an operating state of a vehicle, is known. The operating evaluation system calculates an operating state of a vehicle and evaluates the driving technique of a driver on the basis of various sensors which measure the angular speed of the vehicle, acceleration added to the vehicle, speed, and the like, and processors which perform various computations based on the results of detection performed by the sensors.

In addition to the above-described driving evaluation system, a driving evaluation system has been further developed (for example, refer to PTL 1) which evaluates drive of a vehicle by specifying a travel section in an intersection based on reap data prepared in advance and applying behavior information, which is associated with a vehicle position in a travel section within the specified intersection, to a predetermined prescribed condition.

According to the driving evaluation system disclosed in PTL 1, a travel situation is estimated based on the map data and the travel route, and thus, it is possible to improve the accuracy of estimation of the travel situation. That is, it is possible to improve the accuracy of determination relevant to right or left turns in an intersection, such as a location where the vehicle starts to turn right or left in the intersection and a location where the vehicle finishes turning right or left in the intersection.

CITATION LIST

Patent Literature

[PTL 1] Japanese Unexamined Patent Application, First Publication NO. 2013-114319

SUMMARY OF INVENTION

Technical Problem

A bus transport service, which enables a plurality of buses to travel and transport passengers through determined travel routes, is used for various places, for example, for circular route buses, which circulate within a site such as a university or a factory, in addition to general transport buses. When such a bus transport service is operated, in order to improve service quality, it is important whether or not relative operating states for each bus, particularly, vehicle intervals are maintained at proper intervals.

Because of such circumstances, when a business operator who provides the bus transport service evaluates a bus driver, there is a demand to evaluate the driver based on relative operating states of other vehicles, for example, the driver performs driving while maintaining a prescribed vehicle interval. However, in the technology disclosed in PTL 1, while it is possible to evaluate the driving technique of drivers according to the travel states of other vehicles, it is difficult to meet the demand for evaluating drivers based on the relative operating states of a plurality of vehicles as described above.

The present invention provides an operating management system, an operating management method, and a program that are capable of evaluating a driver based on a relative operating states of a plurality of traveling vehicles.

Solution to Problem

According to a first aspect of the present invention, there is provided an operating management system including: on-board units that are to be mounted on a plurality of vehicles and are configured to be capable of acquiring travel information which includes positional information on each vehicle; and an operating management apparatus that includes (i) a travel-information acquisition unit which acquires the travel information from each of the on-hoard units of the plurality of vehicles, and (ii) an evaluation unit which evaluates driving of the vehicles, based on relative operating states, regarding with the plurality of vehicles specified based on the travel information.

In addition, according to a second aspect of the present invention, the operating management apparatus may further include a driving instruction output unit which generates and outputs driving instruction information for driving instruction to each of the plurality of vehicles based on results of evaluation performed by the evaluation unit.

In addition, according to a third aspect of the present invention, the operating management apparatus may further include a vehicle interval computing unit that calculates a vehicle interval between each of the plurality of vehicles and an another adjacent vehicle based on the plurality of pieces of the positional information which are acquired by the onboard units mounted on the plurality of vehicles, and the evaluation unit may evaluate driving of the vehicles based on the vehicle interval.

In addition, according to a fourth aspect of the present invention, the operating management apparatus may further include a traffic jam information acquisition unit that acquires traffic jam information about a route through which the plurality of vehicles travel, and the evaluation unit may evaluate driving of the vehicles based on the traffic jam information and the vehicle interval.

In addition, according to a fifth aspect of the present invention, the operating management apparatus may further include a vehicle occupancy information acquisition unit that acquires vehicle occupancy information which indicates the number of passengers of each of the plurality of vehicles, and the evaluation unit may evaluate driving of the vehicles based on the vehicle occupancy information and the vehicle interval.

In addition, according to a sixth aspect of the present invention, the operating management apparatus may limiter include a proper vehicle allocation number computing unit that calculates proper vehicle allocation numbers such that the vehicle intervals between the plurality of vehicles on the travel route become the proper interval based on results of evaluations performed by the evaluation unit.

In addition, according to a seventh aspect of the present invention, there is provided an operating management method including: acquiring travel information by a travel-information acquisition unit from on-board units that are each mounted on a plurality of vehicles and are configured to be capable of acquiring travel information which includes positional information of the vehicles; and evaluating driving of the vehicles by an evaluation unit, based on relative operating states, for the plurality of vehicles specified based on the travel information.

In addition, according to an eighth aspect of the present invention, there is provided a program causing a computer of an operating management apparatus to function as travel information acquisition unit for acquiring travel information from on-board units that are each mounted on a plurality of vehicles and are configured to be capable of acquiring travel information which includes positional information on each vehicle; and evaluation unit for evaluating driving of the vehicles, based on relative operating states, for the plurality of vehicles specified based on the travel information.

Advantageous Effects of Invention

According to the above-described operating management system, the operating management method, and the program, it is possible to evaluate drivers based on the relative operating states of the plurality of traveling vehicles.

BRIEF DESCRIPTION OF DRAWINGS

FIG. 5 is a diagram illustrating a process of an evaluation unit according to the first embodiment of the present invention.

DESCRIPTION OF EMBODIMENTS

First Embodiment

Hereinafter, an example of a bus operating management system according to a first embodiment of the present invention will be described with reference to the accompanying drawings.

Figure 1:
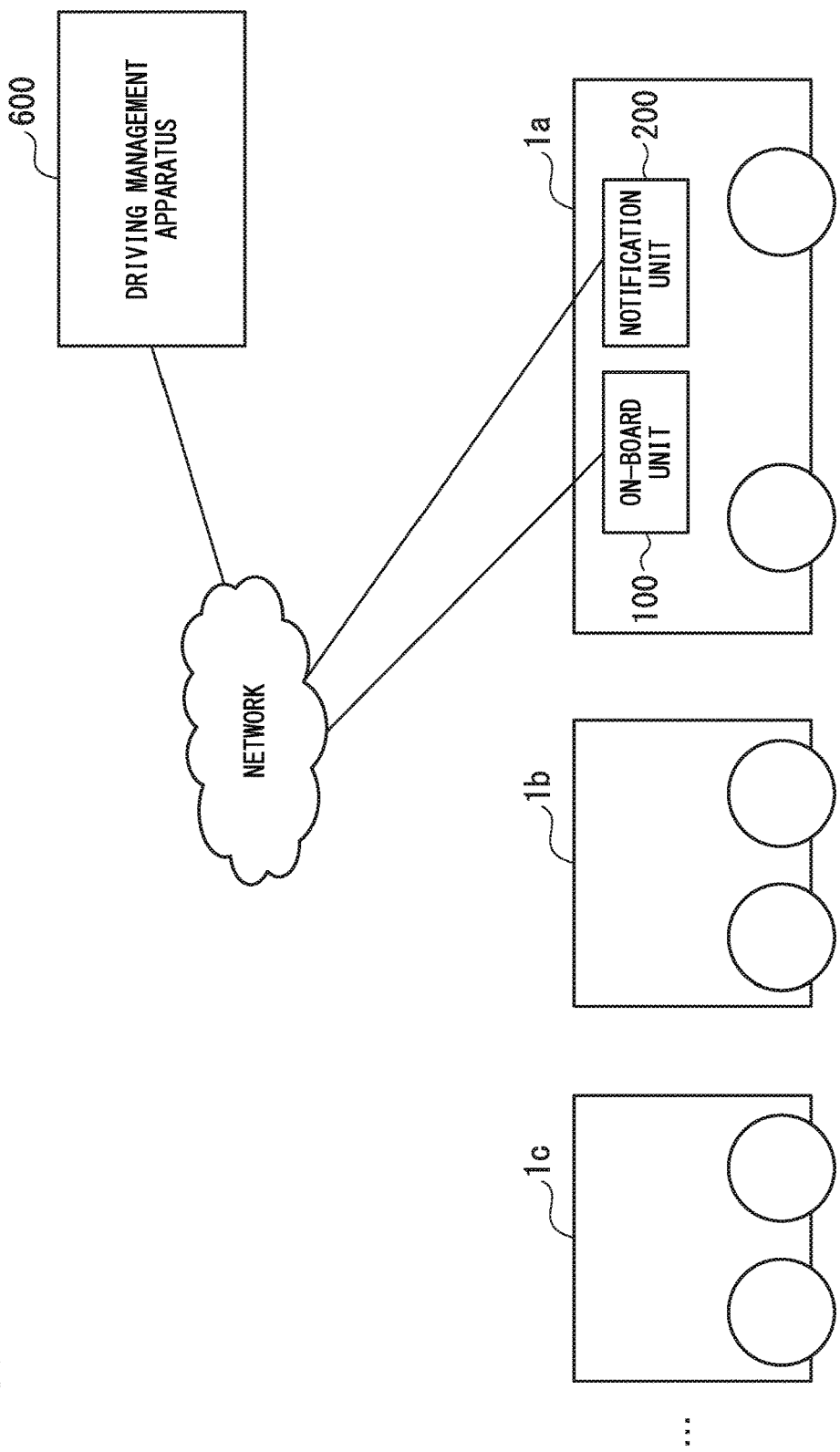
FIG. 1 is a schematic diagram illustrating an example of a bus operating management system according to a first embodiment of the present invention.

FIG. 1 is a schematic diagram illustrating an example of the bus operating management system according to the first embodiment of the present invention.

As illustrated in FIG. 1, the bus operating management system according to the first embodiment of the present invention includes an on-board unit 100, a notification unit 200, and an operating management apparatus 600. In the embodiment, the on-board unit 100 and the notification unit 200 are mounted on a vehicle 1a, and the operating management apparatus 600 is installed on the outside of the vehicle 1a. Meanwhile, the embodiment of the present invention is not limited thereto and the operating management apparatus 600 may be mounted on the vehicle 1a. In addition, although not shown in FIG. 1, vehicles 1b, 1c, . . . have the same functional configuration as the vehicle 1a.

In the embodiment, the vehicles 1a, 1b, 1c, . . . are, for example, buses, that is, circular route buses which circulate within a site such as a university or a factory. However, the embodiment of the present invention is not limited thereto and the vehicles may include a private car, a taxi, a track, a train, a monorail, and the like.

In addition, the vehicles 1a, 1b, 1c, . . . are not limited to vehicles which circulate a ring-shaped travel route and may include vehicles which travel non-ringing-shaped travel routes.

The on-board unit 100 is a device which is mounted in each of the plurality of vehicles 1a, 1b, . . . , and which is capable of acquiring travel information that includes the positional information of each of the vehicles 1a, 1b, . . . .

The notification unit 200 is, for example, a display monitor, a speaker, or the like, and provides notification about the content of a driving instruction issued for each of the drivers of the vehicles 1a, 1b, . . . and is received from the operating management apparatus 600.

The operating management apparatus 600 acquires travel information which includes the positional information of the plurality of vehicles 1a, 1b, . . . , and manages the driving of the vehicles 1a, 1b, . . . . Specifically, the operating management apparatus 600 has a function of evaluating the relative operating states) if the plurality of vehicles 1a, 1b, . . . . The detailed functional configuration of the operating management apparatus 600 will be described later.

Figure 2:
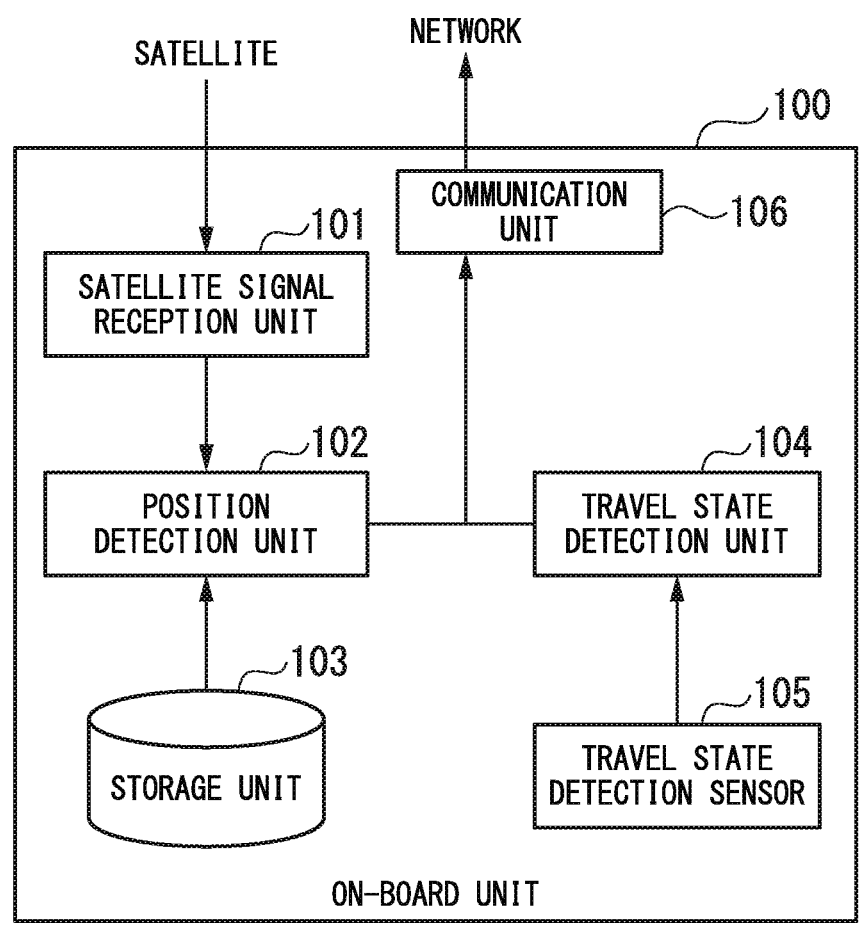
FIG. 2 is a block diagram illustrating an example of each of configurations of an on-board unit according to the first embodiment of the present invention.

FIG. 2 is a block diagram illustrating an example of each configuration of the on-board unit according to the first embodiment of the present invention.

As illustrated in FIG. 2, the on-board unit 100 includes a satellite signal reception unit 101, a position detection unit 102, a storage unit 103, a travel state detection unit 104, a travel state detection sensor 105, and a communication unit 106.

The satellite signal reception unit 101 receives signals which are issued from satellites using a Global Navigation Satellite System (GNSS), and outputs positioning information.

The position detection unit 102 specifies the current position (hereinafter, referred to as a vehicle position) of the on-board unit 100 (vehicles 1a, 1b, . . . ) based on the positioning information which is output from the satellite signal reception unit 101 and map information which is acquired in advance. The position detection unit 102 specifies the vehicle position of the vehicle on a map, which is stored in the storage unit 103 in advance, using, for example, a map matching technology. In addition, the position detection unit 102 transmits the positional information indicative of the specified vehicle position to the operating management apparatus 600 through the communication unit 106.

The travel state detection sensor 105 includes an acceleration sensor, an angular speed sensor, and the like, and outputs information indicative of a detected speed, acceleration, and an angular speed to the travel state detection unit 104 as the travel information other than the positional information.

The travel state detection unit 104 transmits the travel information indicative of the speed, the acceleration, and the angular speed, which are detected by the travel state detection sensor 105, to the operating management apparatus 600 through the communication unit 106 (FIG. 1).

The communication unit 106 is connected to the operating management apparatus 600 through the network. The communication unit 106 transmits the travel information (positional information, speed information, and the like) of the vehicle to the operating management apparatus 600. Meanwhile, the communication unit 106 may be a communication unit which performs short-range communication with a road side machine (not shown in the drawing) that is provided on the road side of a travel route through which the vehicles 1a, 1b, . . . travel. In this case, the communication unit 106 transmits the travel information to the operating management apparatus 600 which is connected to a wide area network through the road side machine (not shown in the drawing).

Figure 3:
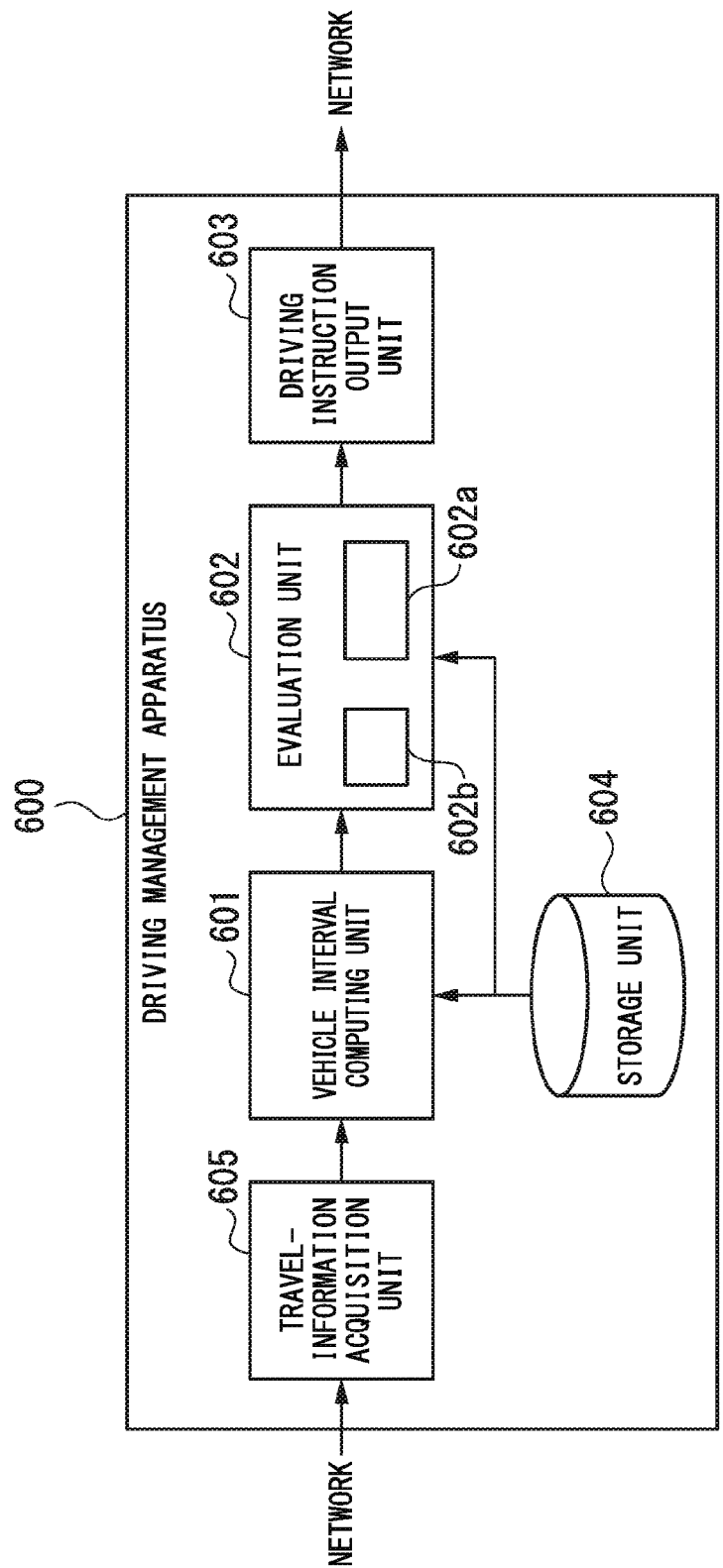
FIG. 3 is a block diagram illustrating an example of each of configurations of an operating management apparatus according to the first embodiment of the present invention.

FIG. 3 is a block diagram illustrating an example of each configuration of the operating management apparatus according to the first embodiment of the present invention.

As illustrated in FIG. 3, the operating management apparatus 600 includes a vehicle interval computing unit 601, an evaluation unit 602, a driving instruction output unit 603, a storage unit 604, and a travel-information acquisition unit 605.

The travel-information acquisition unit 605 is connected to the on-board unit 100 and the notification unit 200 which are mounted on each of the vehicles 1a, 1b, . . . through the network. Further, the travel-information acquisition unit 605 receives positional information which is received from the on-board unit 100 that is mounted on each of the plurality of vehicles 1a, 1b, . . . .

The vehicle interval computing unit 601 calculates the vehicle interval L between each of the plurality of vehicles 1a, 1b, . . . and another vehicle, which is adjacent to each of the plurality of vehicles 1a, 1b, . . . , based on a plurality of pieces of positional information which are received by the travel-information acquisition unit 605 and the map information which is stored in the storage unit 604 in advance. A process performed by the vehicle interval computing unit 601 will be described later in detail with reference to FIG. 4.

The evaluation unit 602 evaluates relative operating states of the plurality of vehicles 1a, 1b, . . . based on the vehicle interval L which is calculated by the vehicle interval computing unit 601. Specifically, the evaluation unit 602 includes an evaluation reference setting unit 602a that sets a predetermined evaluation reference value. The evaluation unit 602 determines whether or not the vehicle interval L between adjacent vehicles is maintained at an appropriate vehicle interval with reference to a lower-limit vehicle interval value Lth1 and an upper-limit vehicle interval value Lth2 which are evaluation reference values set by the evaluation reference setting unit 602a. Further, the evaluation unit 602 performs a process of evaluating drivers of the vehicles 1a, 1b, . . . using an evaluation table 602b based on the result of determination. For example, when a vehicle interval Lab between the vehicle 1a and the vehicle 1b is less than the lower-limit vehicle interval value Lth1 or higher than the upper-limit vehicle interval value Lth2, which are set by the evaluation reference setting unit 602a, the evaluation unit 602 performs a process of subtracting evaluation scores for each driver of the vehicle 1a and the vehicle 1b which are recorded in the evaluation table 602b.

The driving instruction output unit 603 generates driving instruction information for instructing to drive the plurality of vehicles 1a, 1b, . . . based on the result of evaluation performed by the evaluation unit 602, and transmits the driving instruction information to the vehicles 1a, 1b, . . . . Specifically, when the result of evaluation performed by the evaluation unit 602 is input, the driving instruction output unit 603 generates the driving instruction information such that evaluation for the driver to be corrected, and transmits the driving instruction information to the notification units 200 of the vehicles 1a, 1b, . . . through the network (FIG. 1). In this case, the notification unit 200 notifies the content of the driving instruction to the driver based on the received driving instruction information. For example, when the evaluation unit 602 determines that the vehicle interval Lab is less than the lower-limit vehicle interval value Lth1, the driving instruction output unit 603 transmits a driving instruction to reduce a travel speed to the notification unit 200 of a preceding vehicle 1a and transmits a driving instruction to increase the travel speed to the notification unit 200 of a subsequent vehicle 1b.

Figure 4:
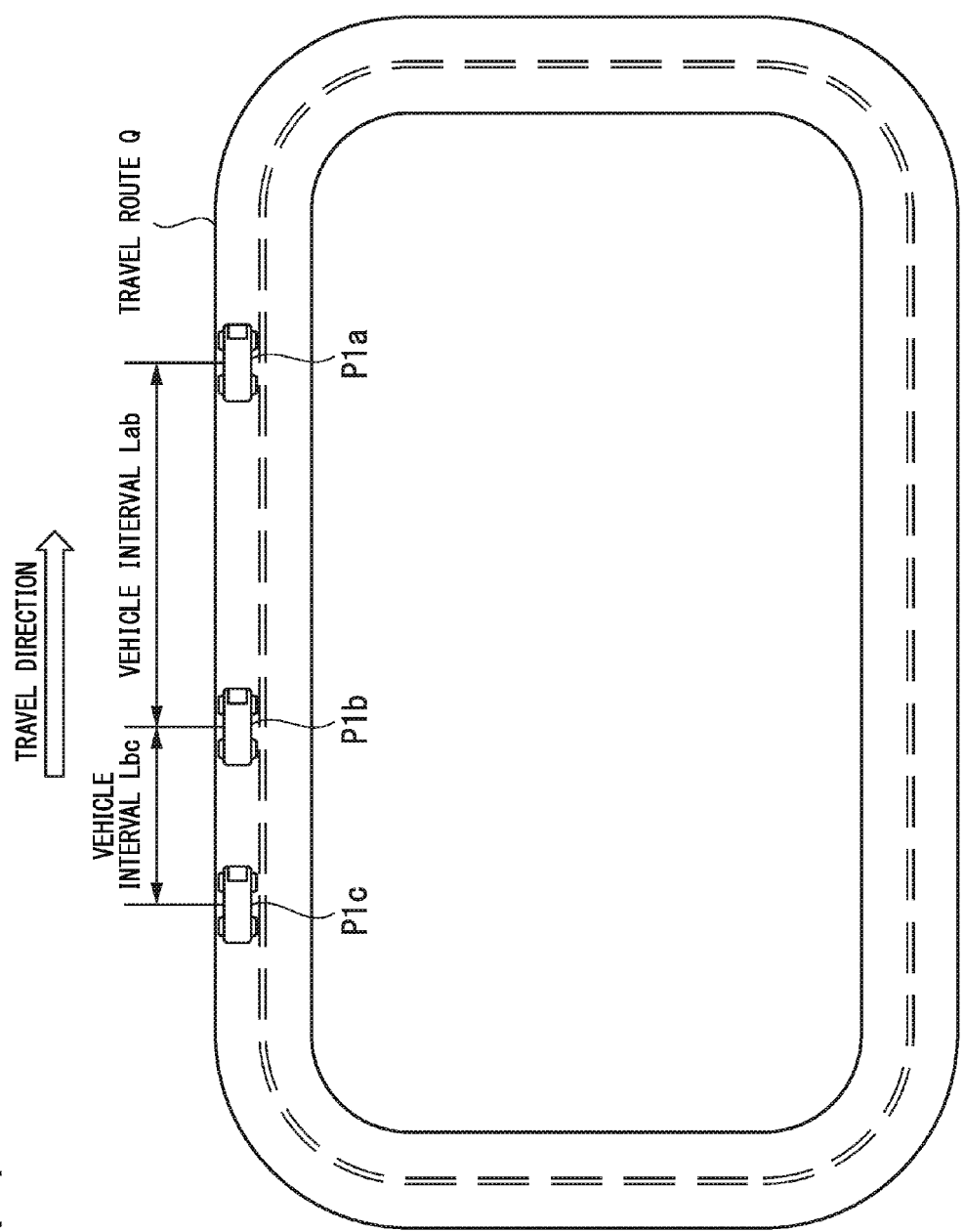
FIG. 4 is a diagram illustrating a process of a vehicle interval computing unit according to the first embodiment of the present invention.

FIG. 4 is a diagram illustrating a process of the vehicle interval computing unit according to the first embodiment of the present invention.

As illustrated in FIG. 4, the vehicle interval computing unit 601 specifies the travel positions P1a, P1b, . . . of the vehicles 1a, 1b, . . . on a travel route Q based on the positional information of the vehicles 1a, 1b, . . . received from the on-board units 100 and the map information stored in the storage unit 604. Further, the vehicle interval computing unit 601 calculates the vehicle interval L between adjacent other vehicles based on the travel positions P1$a$, P1$b$, .... For example, the vehicle interval computing unit 601 calculates the vehicle interval Lab with reference to the travel positions P1$a$ and P1$b$.

When the vehicle interval computing unit 601 calculates, for example, the vehicle interval Lab, the vehicle interval computing unit 601 calculates the distance between the travel positions P1$a$ and P1$b$ on the travel route Q as the vehicle interval Lab.

FIG. 5 is a diagram illustrating a process of the evaluation unit according to the first embodiment of the present invention.

The evaluation unit 602 includes the evaluation table 602*b* therein. As illustrated in FIG. 5, the evaluation table 602*b* is an information table in which the vehicles 1*a*, 1*b*, ... associated with evaluation scores are stored.

As described above, the evaluation unit 602 evaluates the relative operating states of the vehicles 1*a*, 1*b*, . . . . Specifically, the vehicle interval Lab between the vehicle 1*a* and the vehicle 1*b* is less than the lower-limit vehicle interval value Lth1, the evaluation unit 602 determines that the operating state of the vehicle 1*a* and the vehicle 1*b* are not preferable, and performs a process of reducing the evaluation scores of the vehicle 1*a* and the vehicle 1*b* which are recorded in the evaluation table 602*b* (FIG. 5).

A driver evaluation method performed by the evaluation unit 602 is not limited to the above-described method. For example, the evaluation unit 602 may perform driver evaluation using an addition method in which addition is performed when desired driving is performed instead of a reduction method as described above.

Figure 6:
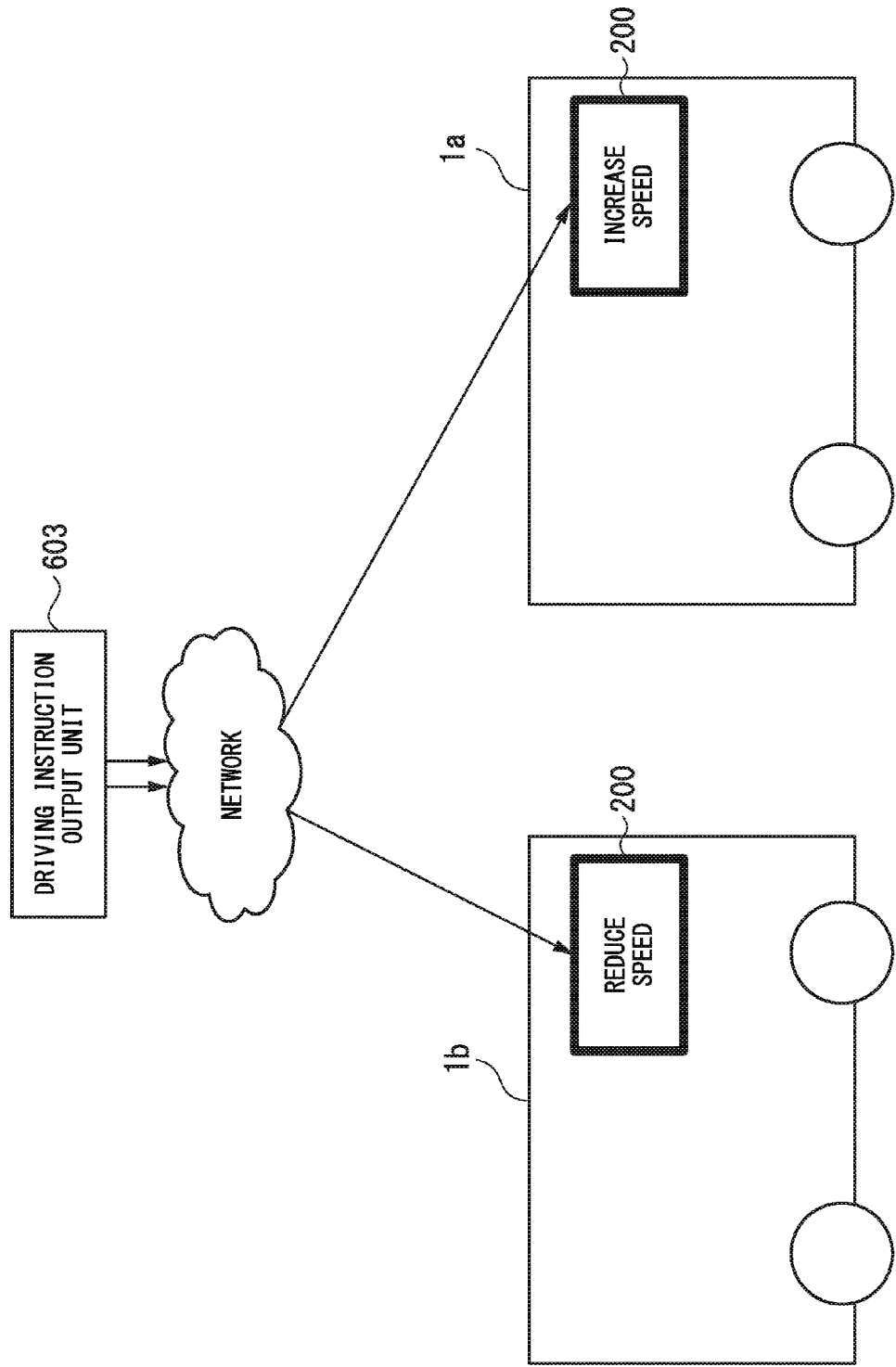
FIG. 6 is a diagram illustrating a process of a driving instruction output unit according to the first embodiment of the present invention.

FIG. 6 is a diagram illustrating a process of the driving instruction output unit according to the first embodiment of the present invention.

As described above, the driving instruction output unit 603 generates and outputs driving instruction information to instruct to drive the vehicles 1*a*, 1*b*, ... based on the result of evaluation performed by the evaluation unit 602.

For example, when the evaluation unit 602 determines that the vehicle interval Lab between the vehicle 1*a* and the vehicle 1*b* is less than the lower-limit vehicle interval value Lth1, the driving instruction output unit 603 generates driving instruction information of "increase speed" with reference to the evaluation result, and transmits the driving instruction information to the notification unit 200 (in the example, display monitor) of the preceding vehicle 1*a*. When the notification unit 200 of the vehicle 1*a* receives the driving instruction information, the notification unit 200 of the vehicle 1*a* displays a driving instruction to "increase speed" and notifies the driver. In contrast, the driving instruction output unit 603 generates driving instruction information of "reduce speed" at the same time as the process, and transmits the driving instruction information to the notification unit 200 of the subsequent vehicle 1*b*. The notification unit 200 of the vehicle 1*b* receives the driving instruction information and notifies the driver about the driving instruction to "reduce speed" by displaying the driving instruction.

Therefore, the driver of the vehicle 1*a* accelerates the vehicle 1*a* according to the driving instruction, and the driver of the vehicle 1*b* decelerates the vehicle 1*b* according to the driving instruction. If so, the state in which the vehicle interval Lab between the vehicle 1*a* and the vehicle 1*b* is less than the lower-limit vehicle interval value Lth1 is recovered to the appropriate vehicle interval, and thus the operating state in which the vehicle interval is narrow is corrected.

The driving instruction output unit 603 may simultaneously transmit information indicative of the reason of the instruction, driving situation, or the like in addition to the simple instructions of "increase speed" and "reduce speed". For example, the driving instruction output unit 603 may transmit driving instruction information "increase (reduce) speed because the vehicle interval with a front vehicle is extending (is reducing)" or the like.

Figure 7:
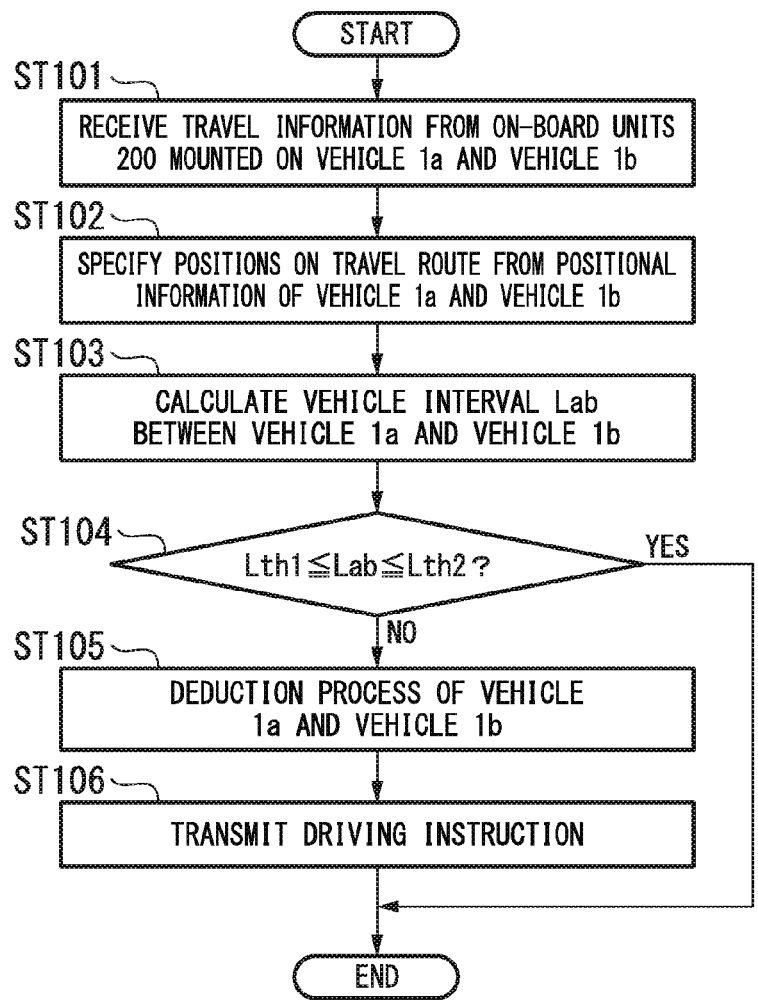
FIG. 7 is a flowchart illustrating the flow of a process performed by the operating management apparatus according to the first embodiment of the present invention.

FIG. 7 is a flowchart illustrating the flow of a process performed by the operating management apparatus according to the first embodiment of the present invention.

Hereinafter, the flow of the process performed by the operating management apparatus 600 which has the above-described functional configuration will be described according to procedures with reference to FIG. 7.

First, the vehicle interval computing unit 601 receives positional information from the on-board units 100 mounted on the vehicle 1*a* and the vehicle 1*b* through the network (step ST101).

Subsequently, the vehicle interval computing unit 601 specifies the positions P1$a$ and P1$b$ of the vehicles 1*a* and 1*b* on the travel route Q (FIG. 4) based on the map information which is stored in the storage unit 604 (FIG. 3) in advance (step ST102).

Subsequently, the vehicle interval computing unit 601 calculates the vehicle interval Lab between the vehicle 1*a* and the vehicle 1*b* based on the specified travel positions P1$a$ and P1$b$ (step ST103).

The evaluation unit 602 performs a process of determining whether or not the vehicle interval Lab, which is calculated by the vehicle interval computing unit 601, is included in a range between the lower-limit vehicle interval value Lth1 and the upper-limit vehicle interval value Lth2 which are set by the evaluation reference setting unit 602*a* in advance (step ST104).

When the vehicle interval Lab is included in the range between the lower-limit vehicle interval value Lth1 and the upper-limit vehicle interval value Lth2 (step ST104: YES), the evaluation unit 602 ends the process without performing the reduction process.

In contrast, when the vehicle interval Lab is not included in the range between the lower-limit vehicle interval value Lth1 and the upper-limit vehicle interval value Lth2 (step ST104: NO), the evaluation unit 602 performs a process of reducing evaluation scores for the vehicles 1*a* and 1*b* in which the vehicle interval is not included in the range in the evaluation table 602*b* (FIG. 5) (step ST105, refer to FIG. 5).

The driving instruction output unit 603 transmits driving instruction information indicative of a driving instruction to correct the operating state to the vehicles 1*a* and 1*b* which are score reduction objects, based on the result of determination performed by the evaluation unit 602 in step ST104 (step ST106). If so, the drivers of the vehicles 1*a* and 1*b*, who receive the driving instruction information, drive according to the driving instruction, and the operating state which is a score reduction object is corrected.

The operating management apparatus 600 repeats the above flowchart for the vehicle intervals Lbc, Lcd, ... between other vehicles 1*b*, 1*c*, 1*d*, ... and evaluates the other vehicles 1*b*, 1*c*, 1*d*, .....

In addition, the operating management apparatus 600 further repeats the flow of the process of the evaluation for all of the vehicles 1*a*, 1*b*, ... on a fixed cycle, and adds up the reduction points. Therefore, the operating management apparatus 600 can evaluate the driving of the drivers, integrally.

Hereinafter, the bus operating management system according to the first embodiment of the present invention can evaluate the relative operating states for the plurality of vehicles based on the travel information of the plurality of buses. Therefore, an operator of a transport service using the buses can accurately evaluate drivers from a point of view whether or not an appropriate transport service is provided.

In addition, in a case of an inappropriate operating state as in the vehicle interval is narrow between some vehicles, the bus operating management system according to the embodiment directly gives a driving instruction to the drivers of the vehicles which are objects. Accordingly it is possible to rapidly restore from the inappropriate operating state.

When it is determined that the vehicle interval is deviated from the appropriate vehicle interval (step ST104: NO in FIG. 5), the evaluation unit 602 may not directly perform the score reduction process (step ST105 in FIG. 5). Specifically, when it is determined that the vehicle interval is deviated from the proper vehicle interval and after fixed time elapses from the time point or when the bus arrives at a subsequent bus station, the evaluation unit 602 may perform the score reduction process for the first time after it is determined that the state is not improved.

In addition, in this case, the driving instruction output unit 603 may display (for example, "pay attention") which indicates that the evaluation unit 602 determines that the vehicle interval is deviated from the appropriate vehicle interval but does not perform score reduction yet. When the evaluation unit 602 performs the score reduction process as a result that the state in which the vehicle interval is deviated from the appropriate vehicle interval is continued for fixed time, the driving instruction output unit 603 may perform display (for example, "warning" or the like), which indicates that the vehicle interval is deviated from the appropriate vehicle interval, on the notification unit 200.

In contrast, when the display, such as the "pay attention" or "warning", is continuously performed for the fixed time, the driving instruction output unit 603 may perform display (for example, "excellent" or the like) for praising the driving of the driver.

Modified Example of First Embodiment

The bus operating management system according to the first embodiment of the present invention can be modified as follows.

The evaluation unit 602 according to the modified example may perform, for example, evaluation (score reduction process) for the vehicles 1a, 1b, . . . and may perform evaluation based on the priorities of evaluation items.

Specifically, the evaluation unit 602 according to the modified example further includes a priority prescribing unit that prescribes the priorities of the evaluation items for the operating state.

For example, it is assumed that the priority prescribing unit prescribes to evaluate vehicle interval with a front side vehicle in preference to the vehicle interval with the back side vehicle. In this case, in the example illustrated in FIG. 4, when all the travel positions P1a, P1b, and P1c of the vehicles 1a, 1b, and 1c are close to each other, a case is assumed in which both the vehicle interval Lab and the vehicle interval Lbc are less than the lower-limit vehicle interval value Lth1. In this case, the evaluation unit 602 considers only a fact that the vehicle interval Lab with the front side vehicle 1a is less than the lower-limit vehicle interval value Lth1 as a score reduction object for the vehicle 1b according to the priority determined by the priority prescribing unit, and simultaneously causes a fact that the vehicle interval Lbc with the subsequent vehicle 1c is less than the lower-limit vehicle interval value Lth1 to not be included in the evaluation items.

In this manner, the evaluation unit 602 can prevent the driver of the vehicle 1b, which is positioned in the middle, from being doubly reduced, and can correctly evaluate the driving of the drivers.

In this case, the driving instruction output unit 603 does not simultaneously transmit contrary driving instructions (for example, instruction to "increase speed" and instruction to "reduce speed") to the driver of the vehicle 1b according to the priorities of the evaluation items which are applied to the evaluation unit 602.

In addition, the evaluation unit 602 according to another modified example of the first embodiment may further include an evaluation object specification unit that specifies vehicles which are evaluation (score reduction process) objects. The evaluation object specification unit according to the modified example specifies the vehicles 1a, 1b, . . . , which are evaluation objects with reference to both the vehicle interval with the front side vehicle and the vehicle interval with the back side vehicle.

For example, when the vehicle interval Lab between the vehicle 1b and the vehicle 1a which travels on the front side of the vehicle 1b is widened and, at the same time, the vehicle interval Lbc between the vehicle 1b and the vehicle 1c which travels the back side of the vehicle 1b is narrowed, the evaluation object specification unit determines that the travel speed of the vehicle 1b is reduced, and specifies only the vehicle 1b as an evaluation object.

In addition, when vehicle interval Lab between the vehicle 1b and the vehicle 1a is narrowed and, at the time, the vehicle interval Lbc between the vehicle 1b and the vehicle 1c is widened, the evaluation object specification unit determines that the travel speed of the vehicle 1b is increased, and specifies only the vehicle 1b as the evaluation object.

In contrast, when the vehicle interval Lab between the vehicle 1b and the vehicle 1a is proper and the vehicle interval Lbc with the vehicle 1c is widened or narrowed, it is determined that the vehicle 1c is decelerated or accelerated, and specifics only the vehicle 1c as the evaluation object.

In the same manner, when the vehicle interval Lbc between the vehicle 1b and the vehicle 1c is proper and the vehicle interval Lab with the vehicle 1a is widened or narrowed, it is determined that the vehicle 1a is decelerated or accelerated, and specifies only the vehicle 1a as the evaluation object.

In this manner, the evaluation unit 602 does not consider a driver who drives while properly maintains the vehicle interval with other vehicles on the front and back sides as a score reduction object, and thus it is possible to reflect the degree of an actual fault into driver evaluation.

In addition, the evaluation object specification unit according to the above-described modified example may acquire speed information and acceleration information which are the travel information for the vehicles 1a, 1b, . . . from the travel state detection unit 104, and may specify the evaluation object based on the acquired speed information and acceleration information. Specifically, when the evaluation unit 602 determines that the vehicle interval Lab between the vehicle 1a and the vehicle 1b is less than the lower-limit vehicle interval value Lth1, the evaluation object specification unit refers to the speed information of the vehicles 1a and 1b. Further, when one of the speeds va and vb of the vehicles 1a and 1b is far more or less than a proper speed vref which is prescribed in advance, only the vehicle is subjected to the evaluation object (score reduction object).

In this manner, the evaluation unit 602 reduces only a driver who drives under of over the proper speed vref, and thus it is possible to more reflect the degree of the actual fault into the driver evaluation.

The valuation unit 602 according to further another modified example of the first embodiment may evaluate the operating states of the vehicles 1a, 1b, . . . based on route information, which is determined for each of the locations on a travel route Q (FIG. 4), and travel information at the location.

Specifically, in the map information which is stored in the storage unit 604, detailed route information, such as "intersection position", "curve curvature", "road width", and "crossing or hump position" for each of the locations on the travel route Q is further stored.

In contrast, the evaluation unit 602 includes a proper travel-information acquisition unit that refers to the positional information of each of the vehicles 1a, 1b, . . . , acquires route information in the position, and acquires proper travel information (proper speed information, proper acceleration information, and proper angular speed information) which is prescribed for each route information. Further, the evaluation unit 602 acquires current travel information (speed information, acceleration information, and angular speed information) from the travel state detection unit 104, and evaluates the operating states of the vehicles 1a, 1b, . . . based on the proper travel information.

For example, when a certain vehicle (vehicle 1a) is traveling a curved section at a location on the travel route Q, the proper travel-information acquisition unit acquires proper angular speed information which indicates the proper angular speed prescribed from the "curve curvature" at the location. Further, the evaluation unit 602 refers to the angular speed information, which is acquired by the travel state detection unit 104 in a case of travel, and the proper angular speed information which is acquired by the proper travel-information acquisition unit. When the angular speed of the vehicle 1a which is traveling the curve section is higher than a proper angular speed which is prescribed based on the curve curvature, the evaluation unit 602 determines that driving is inappropriate, and performs a process of decreasing driver evaluation. In the same manner, when the speed of the vehicle to traveling at a hump is higher than a proper speed prescribed for traveling at a hump, the evaluation unit 602 performs a process of decreasing the evaluation score of the driver of the vehicle 1a.

In this manner, the evaluation unit 602 evaluates drivers based on proper operating states prescribed for each of the locations (an intersection, a crossing, a hump, and the like) on the travel route, and thus it is possible to accurately evaluate the drive manner of the drivers in detail.

In addition, the evaluation unit 602 according to the modified example further includes the above-described evaluation object specification unit. Even when the vehicle interval is deviated from a proper vehicle interval, an evaluation object (score reduction object) may be not subjected according to the situation of the traveling route at that time. For example, when the vehicle interval Lab with the vehicle 1a is widened as a result of inevitably decelerating the speed because the vehicle 1b travels a narrow road or a location where a hump is arranged, the evaluation object specification unit may perform a process of removing the vehicles 1a and 1b from the evaluation object.

In addition, the evaluation unit 602 according to further other modified example of the first embodiment may set different lower-limit vehicle interval value Lth1 and upper-limit vehicle interval value Lth2 for each predetermined section, which is determined in advance, on the travel route Q (FIG. 4).

For example, when the travel route Q has branched roads and the vehicles 1a, 1b, . . . which runs on the branched roads join together, a proper vehicle interval on the route before joining is different from the proper vehicle interval on the route after joining. That is, on the route after joining, the number of vehicles which are present for each unit distance, that is, the vehicles 1a, 1b, . . . increases, and thus the vehicle interval in the section necessarily becomes narrower. Therefore, in this case, the evaluation reference setting unit 602a performs a process of setting a lower-limit vehicle interval value Lth1' and a upper-limit vehicle interval value Lth2', which are acquired by reducing values rather than the lower-limit vehicle interval value Lth1 and the upper-limit vehicle interval value Lth2 that are set in the sections of the branched roads, for the vehicles 1a, 1b, . . . which travel the route (section) after joining.

In this manner, the evaluation unit 602 appropriately changes evaluation reference according to a situation in the traveling section, and thus it is possible to accurately perform driver evaluation.

The evaluation reference setting unit 602a may set the lower-limit vehicle interval value Lth1 and the upper-limit vehicle interval value Lth2 in association with a time period in a case of travel in addition to the section of the travel route Q. Therefore, when the allocation numbers of the vehicles 1a, 1b, . . . change according to the time period, the evaluation unit 602 can appropriately change determination reference according to the change in the number of driving vehicles.

In addition, the evaluation unit 602 according to further another modified example of the first embodiment may determine whether or not driving is performed based on a predetermined driving timetable, and may evaluate the operating states of the vehicles 1a, 1b, . . . based thereon.

Specifically, the evaluation unit 602 according to the modified example further includes, in addition to the above-described evaluation object specification unit, a driving timetable information storage unit that stores a predetermined driving timetable, and a clocking unit that clocks current time. Here, the driving timetable information storage unit associates the positional information, which indicates the position of a bus stop, with an estimated time of arrival at each bus stop and stores the information as driving timetable information.

The evaluation object specification unit refers to the positional information, which indicates the position of a bus stop, and the estimated time of arrival at each bus stop, and specifies positions (target positions) on the travel route where the vehicles should be preset at current time in order that the vehicle maintains the driving timetable.

Further, when the evaluation unit 602 determines that the vehicle interval Lab between the vehicle 1a and the vehicle 1b is less than the lower-limit vehicle interval value Lth1, the evaluation object specification unit compares current positions, which are indicated by the positional information of the vehicle 1a and vehicle 1b, and the target positions. Further, when the current position of one of the target positions of the vehicles 1a and 1b is largely deviated from the target position, only the vehicle is subjected to the evaluation object (score reduction object).

In this manner, when an inappropriate vehicle interval is generated even though the drivers of the vehicles 1a, 1b, . . . maintain the driving timetable, it is possible to determine that the inappropriate vehicle interval is not generated due to the fault of the driver and to not perform score reduction. Therefore, the operator of the transport service can more accurately evaluate driving of the vehicle by the driver.

In addition, description is performed such that the operating management apparatus 600 according to the first embodiment includes the driving instruction output unit 603. However, the operating management apparatus 600 according to another modified example may not necessarily include the driving instruction output unit 603. In this case, the operating management apparatus 600 does not perform a process of generating and transmitting the driving instruction (FIG. 7: step ST106) and only perform evaluation for the relative operating states of the vehicles 1a, 1b, . . . based on the process of the evaluation unit 602.

Second Embodiment

Subsequently, an example of a bus operating management system according to a second embodiment of the present invention will be described with reference to the accompanying drawing.

Figure 8:
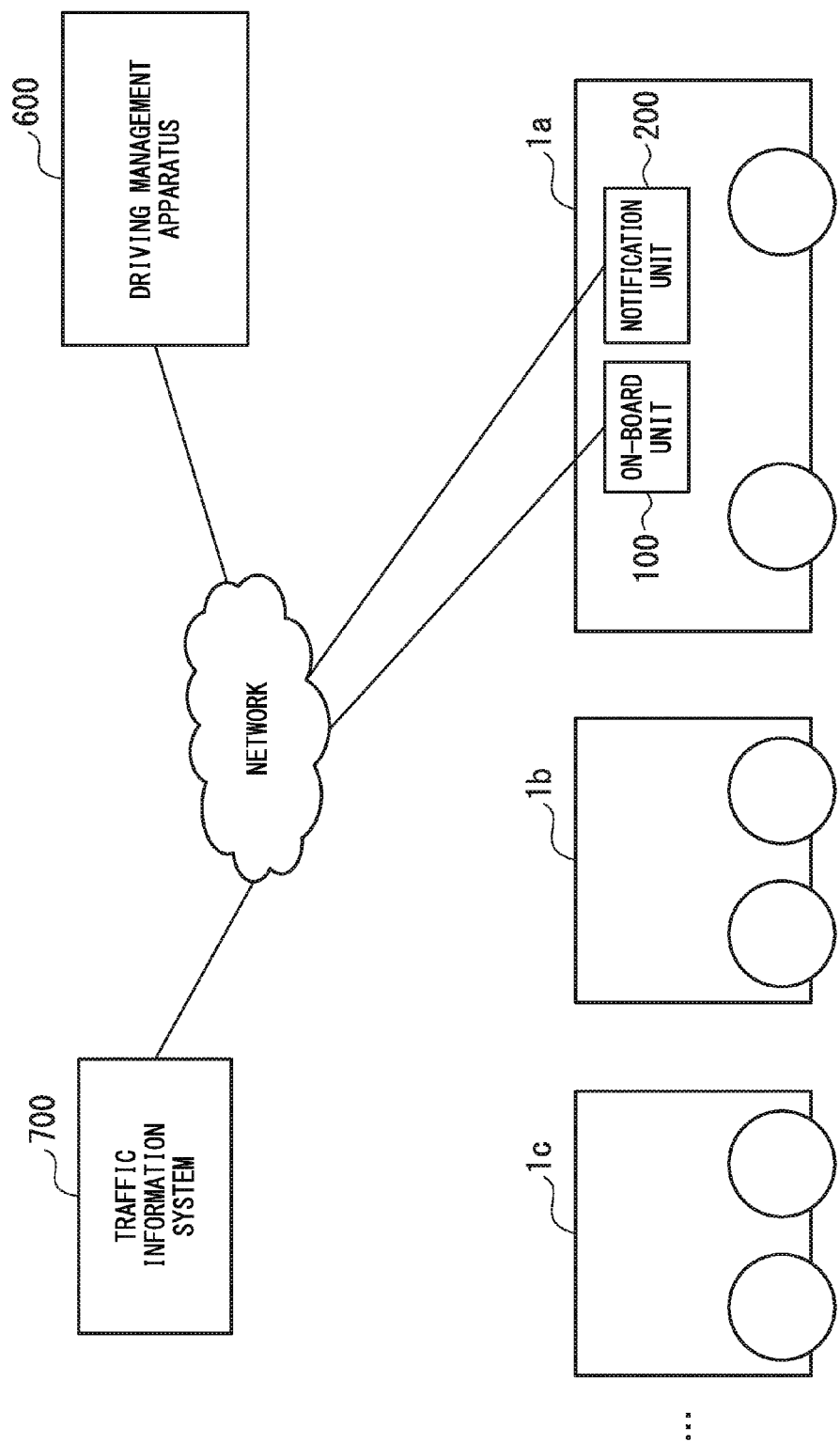
FIG. 8 is a schematic diagram illustrating an example of a bus operating management system according to a second embodiment of the present invention.

FIG. 8 is a schematic diagram illustrating an example of the bus operating management system according to the second embodiment of the present invention.

As illustrated in FIG. 8, the bus operating management system according to the second embodiment of the present invention includes an on-board unit 100, a notification unit 200, an operating management apparatus 600, and a traffic information system 700.

In the embodiment, the on-board unit 100 and the notification unit 200 which are mounted on the vehicles 1a, 1b, . . . have the same functional configurations as in the first embodiment. Therefore, the description thereof will not be repeated.

The traffic information system 700 collects traffic information which is acquired by traffic information acquisition means (for example, sensors, cameras, or the like which detect the pass of vehicles) installed in, for example, a plurality of locations on the travel route, generates traffic jam information which indicates a traffic jam section, and transmits the generated traffic jam information.

Figure 9:
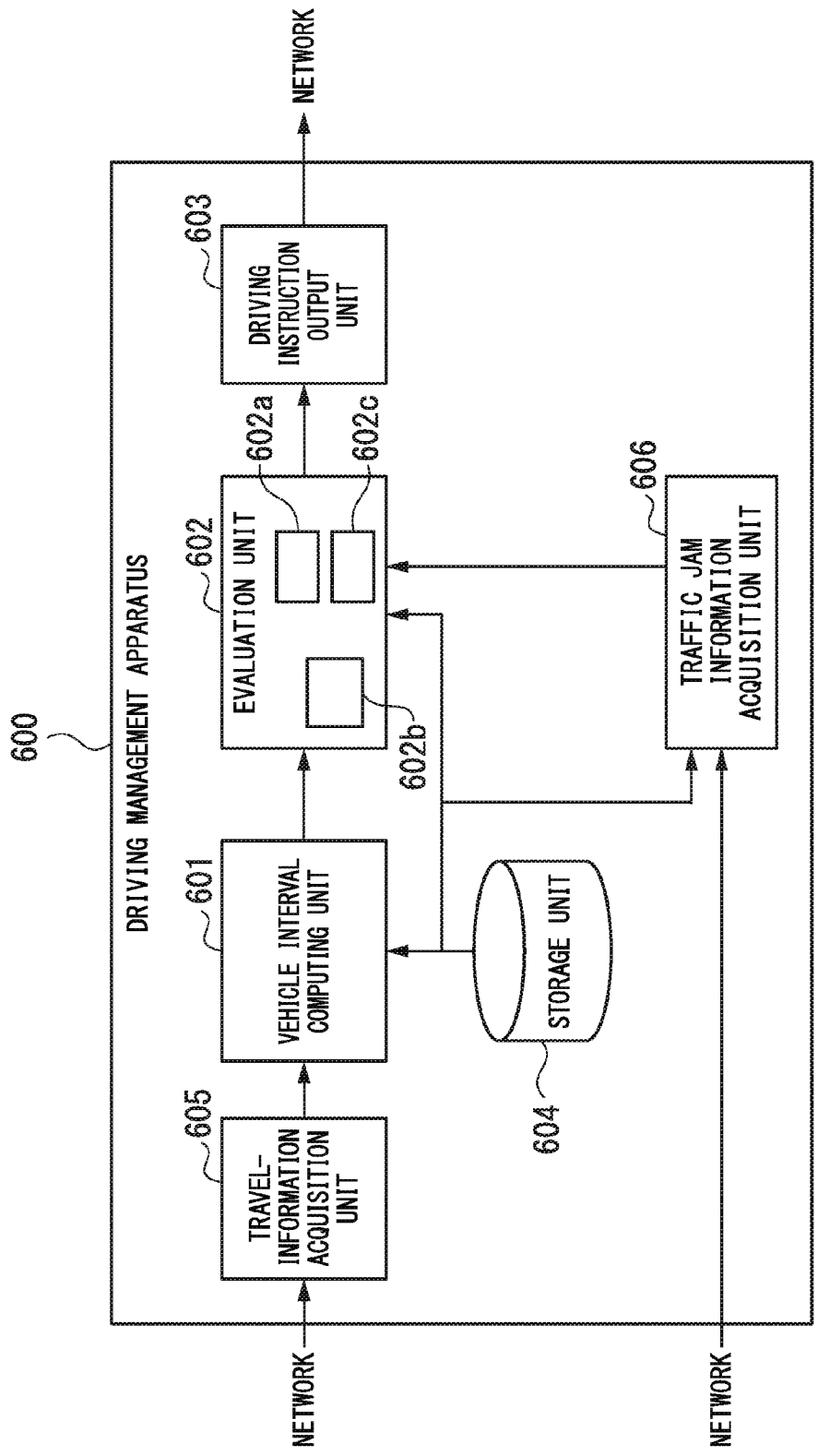
FIG. 9 is a block diagram illustrating an example of each configuration of an operating management apparatus according to the second embodiment of the present invention.

FIG. 9 is a block diagram illustrating an example of each configuration of the operating management apparatus according to the second embodiment of the present invention.

As illustrated in FIG. 9, the operating management apparatus 600 according to the embodiment includes a vehicle interval computing unit 601, an evaluation unit 602, a driving instruction output unit 603, a storage unit 604, a travel-information acquisition unit 605, and a traffic jam information acquisition unit 606.

Here, the vehicle interval computing unit 601, the storage unit 604, and the travel-information acquisition unit 605 have the same functional configurations as in the first embodiment. Therefore, the description thereof will not be repeated.

The traffic jam information acquisition unit 606 receives the traffic jam information from the traffic information system 700 (FIG. 8) through a network. The traffic jam information acquisition unit 606 reflects the received traffic jam information into the map information which is stored in the storage unit 604 in advance, and sets a traffic jam section on the travel route of the vehicles 1a, 1b, . . . .

The facts that the operating management apparatus 600 according to the embodiment includes the traffic jam information acquisition unit 606 and the evaluation. unit 602 performs evaluation of the relative operating states of the vehicles 1a, 1b, . . . based on the traffic jam information acquired by the traffic jam information acquisition unit 606 are different from the first embodiment.

Figure 10:
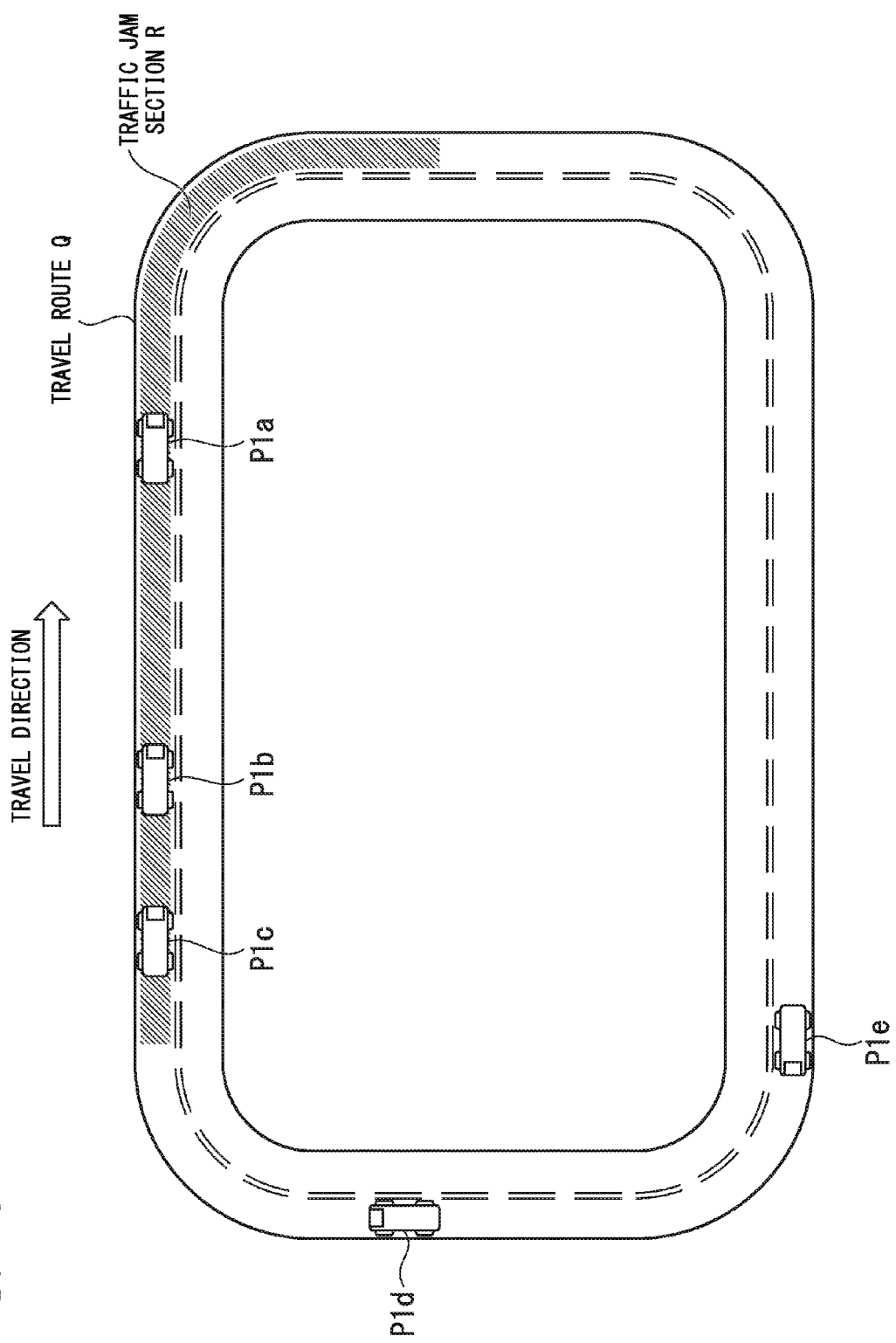
FIG. 10 is a diagram illustrating a process of an evaluation unit according to the second embodiment of the present invention.

FIG. 10 is a diagram illustrating a process of the evaluation unit according to the second embodiment of the present invention.

The evaluation unit 602 of the operating management apparatus 600 according to the embodiment evaluates the relative operating states based on the traffic jam information acquired by the traffic jam information acquisition unit 606 and the vehicle interval calculated by the vehicle interval computing unit 601. Specifically, the evaluation unit 602 includes an evaluation object specification unit 602c which specifies a vehicle which is subjected to the evaluation object (score reduction object). Further, the evaluation object specification unit 602c performs processes of removing the vehicles 1a, 1b, . . . , which are included in a traffic jam section R specified by the traffic jam information acquisition unit 606 based on the traffic jam information, from the evaluation object, and specifying the other vehicles 1a, 1b, . . . as the evaluation objects.

For example, as illustrated in FIG. 10, it is assumed that the vehicle interval computing unit 601 specifies travel positions P1a to P1e of the vehicles 1a to 1e on the travel route. In contrast, the traffic jam information acquisition unit 606 receives the traffic jam information from the traffic information system 700, and specifies the traffic jam section R on the travel route Q based on the map information.

In the example illustrated in FIG. 10, the evaluation object specification unit 602c recognizes that the travel positions P1a, P1b, and P1c of the travel positions P1a to P1c are included in the traffic jam section R. Further, the evaluation object specification unit 602c performs a process of not subjecting the vehicles 1a, 1b, and 1c which are traveling in the traffic jam section to the evaluation objects based on the vehicle interval L, and specifying only the vehicle interval Lde between the vehicles 1d and 1e, which do not travel, in the traffic jam section, to the evaluation object. Therefore, the evaluation unit 602 does not reduce the evaluation score of the vehicles 1a, 1b, . . . , which are in a situation in which it is difficult to adjust the vehicle interval because the vehicles 1a, 1b, . . . are traveling in the traffic jam section, even when the vehicle interval L is not an appropriate vehicle interval.

Accordingly, the evaluation unit 602 subjects only the operating state to the score reduction object based on the fault of drivers, and thus it is possible to accurately evaluate the drivers.

The driving instruction output unit 603 does not transmit the driving instruction to the vehicles 1a, 1b, . . . which are not subjected to the evaluation object of the evaluation unit 602.

Figure 11:
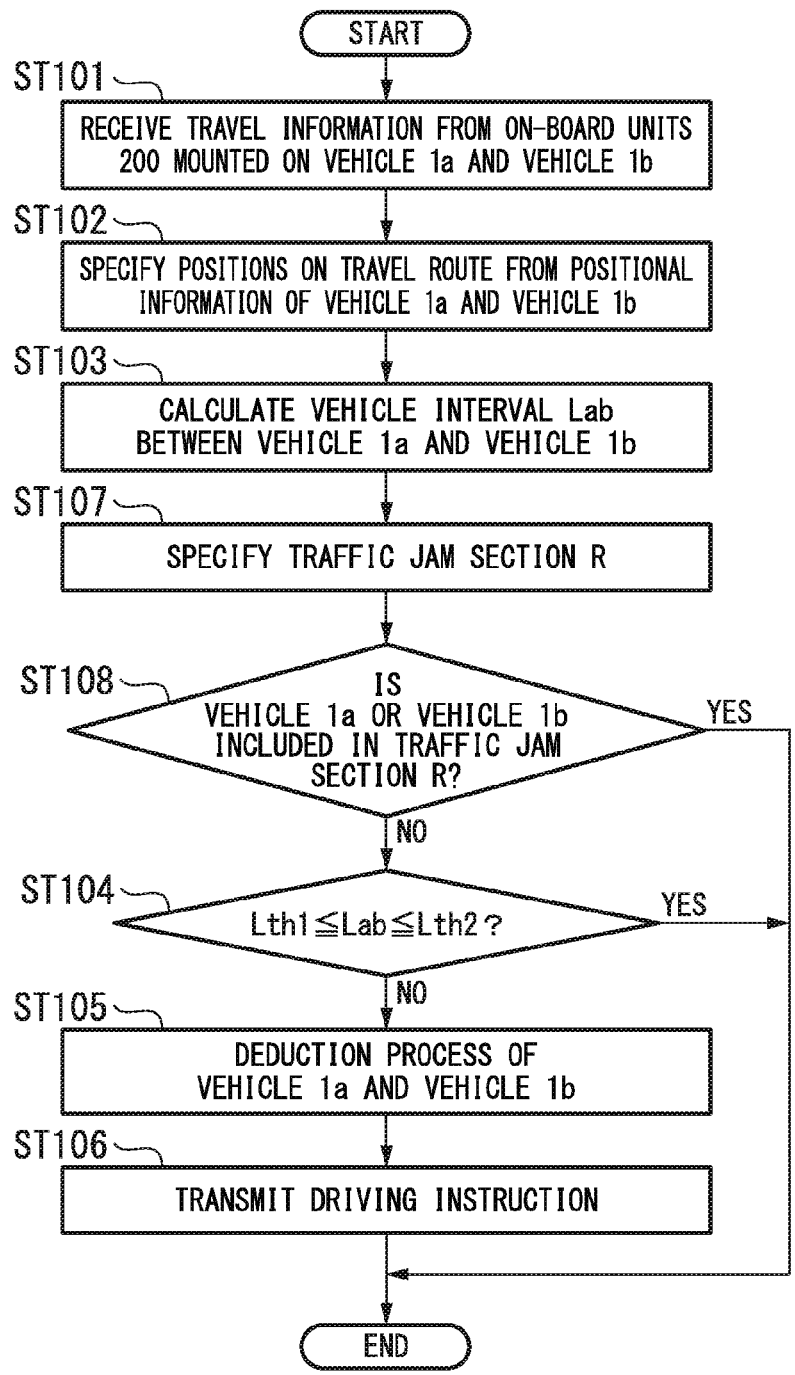
FIG. 11 is a flowchart illustrating the flow of a process performed by the operating management apparatus according to the second embodiment of the present invention.

FIG. 11 is a flowchart illustrating the flow of the process performed by the operating management apparatus according to the second embodiment of the present invention.

In the drawing, the same reference symbols are attached to the same process steps as in the flow of the process (FIG. 7) performed by the operating management apparatus 600 according to the first embodiment, and the description thereof will not be repeated.

In the operating management apparatus 600 according to the embodiment, first, the traffic jam information acquisition unit 606 receives the traffic jam information from the traffic information system 700 after the processes (steps ST101 to 103) performed by the vehicle interval computing unit 601 are performed. Further, the traffic jam information acquisition unit 606 specifies the traffic jam section R on the travel route Q based on the received traffic jam information (step ST107).

Subsequently, the evaluation object specification unit 602c determines whether or not the vehicles 1a and 1b are included in the traffic jam section R based on the positional information which indicates the travel positions P1a and P1b of the vehicles 1a and 1b specified by the vehicle interval computing unit 601 (step ST108). Here, when any one of the vehicles 1a and 1b is included in the traffic jam section R (step ST108: YES), the evaluation unit 602 and the driving instruction output unit 603 ends the evaluation process for the vehicles 1a and 1b without performing subsequent evaluation processes (steps ST104 and 105) and transmitting the driving instruction (step ST106).

In contrast, when both the vehicles 1a and 1b are not included in the traffic jam section R (step ST108: NO), the evaluation unit 602 and the driving instruction output unit 603 perform the process steps for the vehicles 1a and 1b in the processes in steps ST104 to 106.

The operating management apparatus 600 performs the same process on the vehicle intervals Lbc, Lcd, . . . of the other vehicles 1b, 1c, 1d, . . . .

Hereinabove, when an event that the driver evaluation score should be reduced occurs but the event is not caused by the fault of the driver, the bus operating management system according to the second embodiment of the present invention can prevent the score reduction. Therefore, the operator of the transport service can more accurately evaluate the driving of the vehicle by a driver.

Description is performed such that the operating management apparatus 600 according to the above-described second embodiment does not subject the vehicles 1a, 1b, . . . which are included in the traffic jam section R to the evaluation objects. However, the operating management apparatus 600 according to another embodiment is not limited to such a method. For example, the operating management apparatus 600 according to a modified example of the second embodiment may perform evaluation on the vehicle in the traffic jam by reducing reduction points according to the degree of the congestion of the traffic jam.

Third Embodiment

Subsequently, an example of a bus operating management system according to a third embodiment of the present invention will be described with reference to the accompanying drawing.

Figure 12:
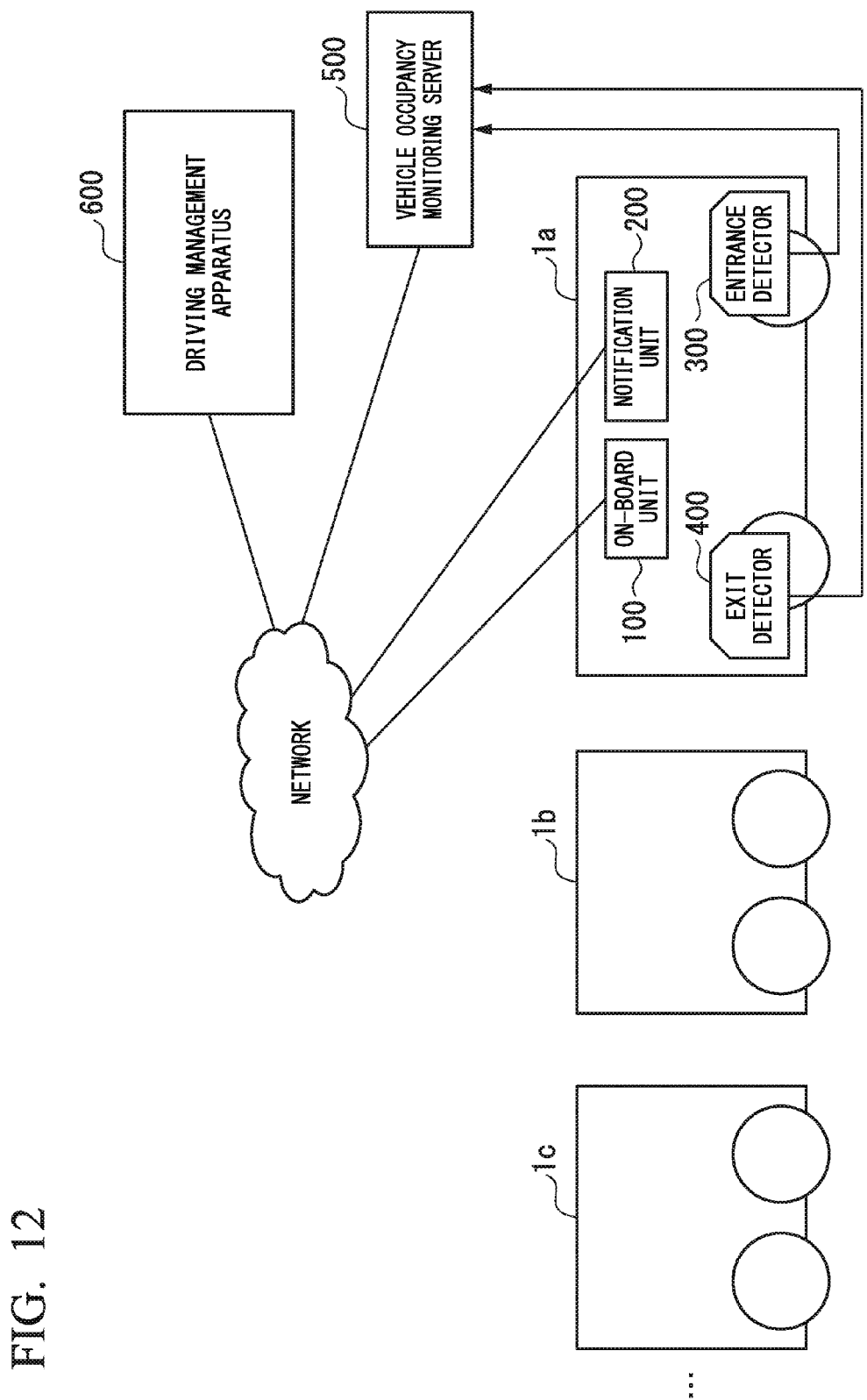
FIG. 12 is a schematic diagram illustrating an example of a bus operating management system according to a third embodiment of the present invention.

FIG. 12 is a schematic diagram illustrating an example of the bus operating management system according to the third embodiment of the present invention.

As illustrated in FIG. 12, the bus operating management system according to the third embodiment of the present invention includes an on-board unit 100, a notification unit 200, an entrance detector 300, an exit detector 400, a vehicle occupancy monitoring server 500, and an operating management apparatus 600.

In the embodiment, the on-board unit 100 and the notification unit 200 mounted on the vehicles 1a, 1b, . . . have the same functional configurations as in the first embodiment. Therefore, the description thereof will not be repeated.

The entrance detector 300 detects a person who passes through an entrance, and outputs information which indicates the detection points. In other words, the entrance detector 300 detects a person who gets in from the entrance, and outputs information which indicates the number of counted getting-in persons hereinafter, getting-in person number information).

The exit detector 400 detects a person who passes through an exit, and outputs information which indicates the detection points. In other words, the exit detector 400 detects a person who gets off from the exit, and outputs information which indicates the number of counted getting-off persons (hereinafter, getting-off person number information).

The vehicle occupancy monitoring server 500 acquires the vehicle occupancy information which indicates the number of passengers of the vehicle 1a, and transmits the vehicle occupancy information to the operating management apparatus 600. Specifically, the vehicle occupancy monitoring server 500 receives the getting-in person number information which is the result of detection performed by the entrance detector 300 and the getting-off person number information which is the result of detection performed by the exit detector 400 through the network. Further, the vehicle occupancy monitoring server 500 calculates the number of getting-in persons in the vehicle 1a based on the received getting-in person number information and the getting-off person number information, and acquires the vehicle occupancy information for the vehicle 1a.

Although not showing in the drawing, the entrance detector 300 and the exit detector 400 are provided in the other vehicles 1b, 1c, . . . . The vehicle occupancy monitoring server 500 acquires the vehicle occupancy information for each of the other vehicles 1b, 1c, . . . in the same manner.

Figure 13:
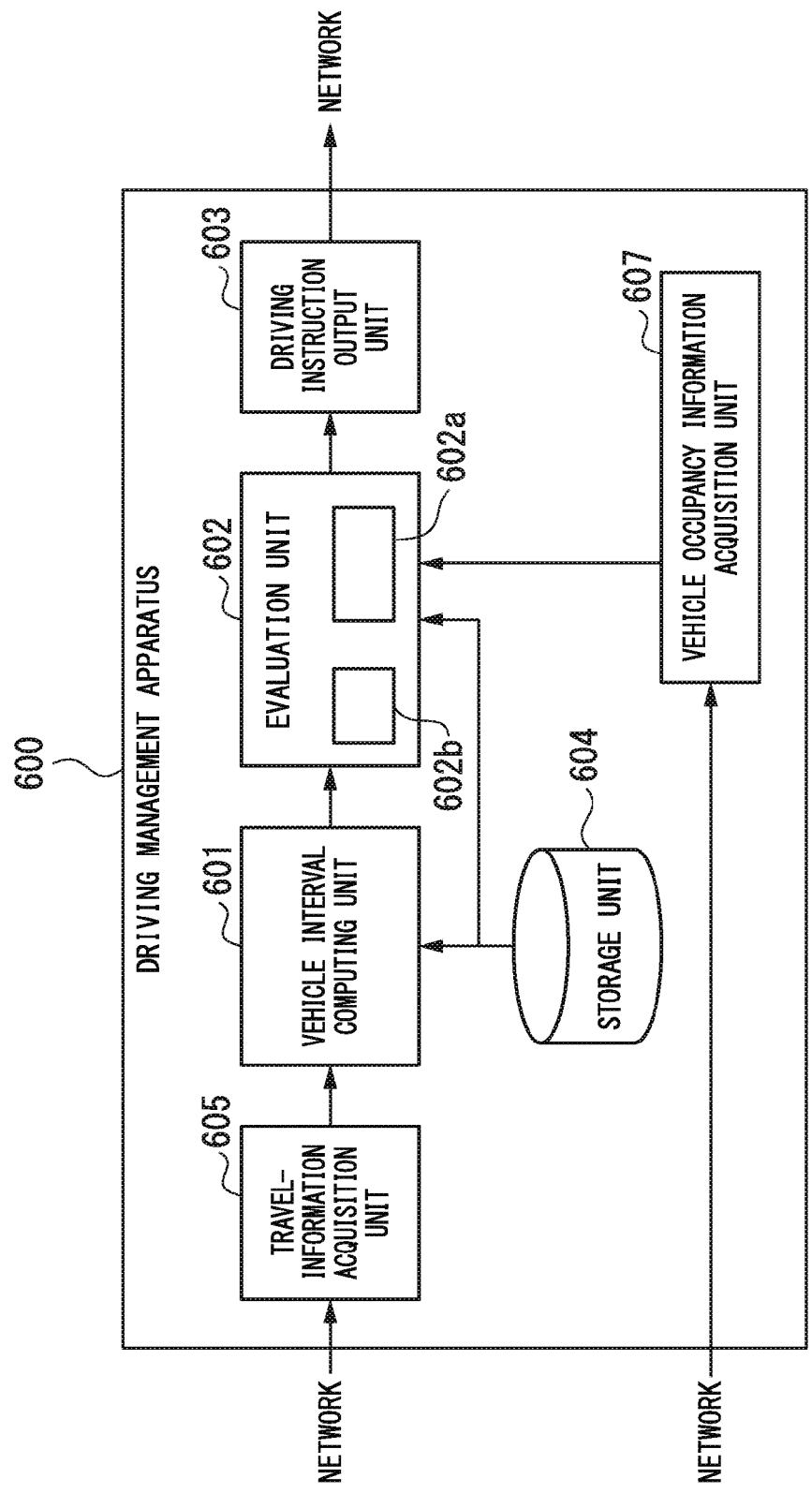
FIG. 13 is a block diagram illustrating an example of each configuration of the operating management apparatus according to the third embodiment of the present invention.

FIG. 13 is a block diagram illustrating an example of each configuration of the operating management apparatus according to the third embodiment of the present invention.

As illustrated in FIG. 13, the operating management apparatus 600 according to the embodiment includes a vehicle interval computing unit 601, an evaluation unit 602, a driving instruction output unit 603, a storage unit 604, a travel-information acquisition unit 605, and a vehicle occupancy information acquisition unit 607.

Here, the vehicle interval computing unit 601, the storage unit 604, and the travel-information acquisition unit 605 have the same functional configurations as the first embodiment. Therefore, the description thereof will not be repeated.

The vehicle occupancy information acquisition unit 607 receives and acquires vehicle occupancy information, which indicates the number of passengers for each of the vehicles 1a, 1b, . . . , from the vehicle occupancy monitoring server 500 (FIG. 12).

The facts that the operating management apparatus 600 according to the embodiment includes the vehicle occupancy information acquisition unit 607 and the evaluation unit 602 performs evaluation on the relative operating states of the vehicles 1a, 1b, . . . based on the vehicle occupancy information acquired by the vehicle occupancy information acquisition unit 607 are different from the first and second embodiments.

Figure 14A:
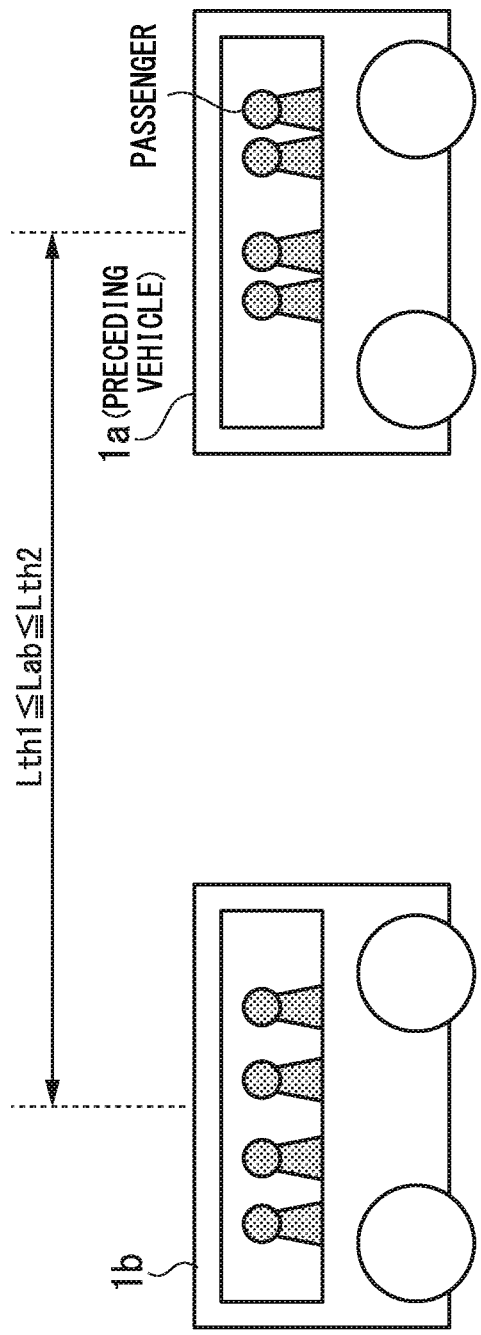
FIG. 14A is a first diagram illustrating a process performed by an evaluation unit according to the third embodiment of the present invention.
Figure 14B:
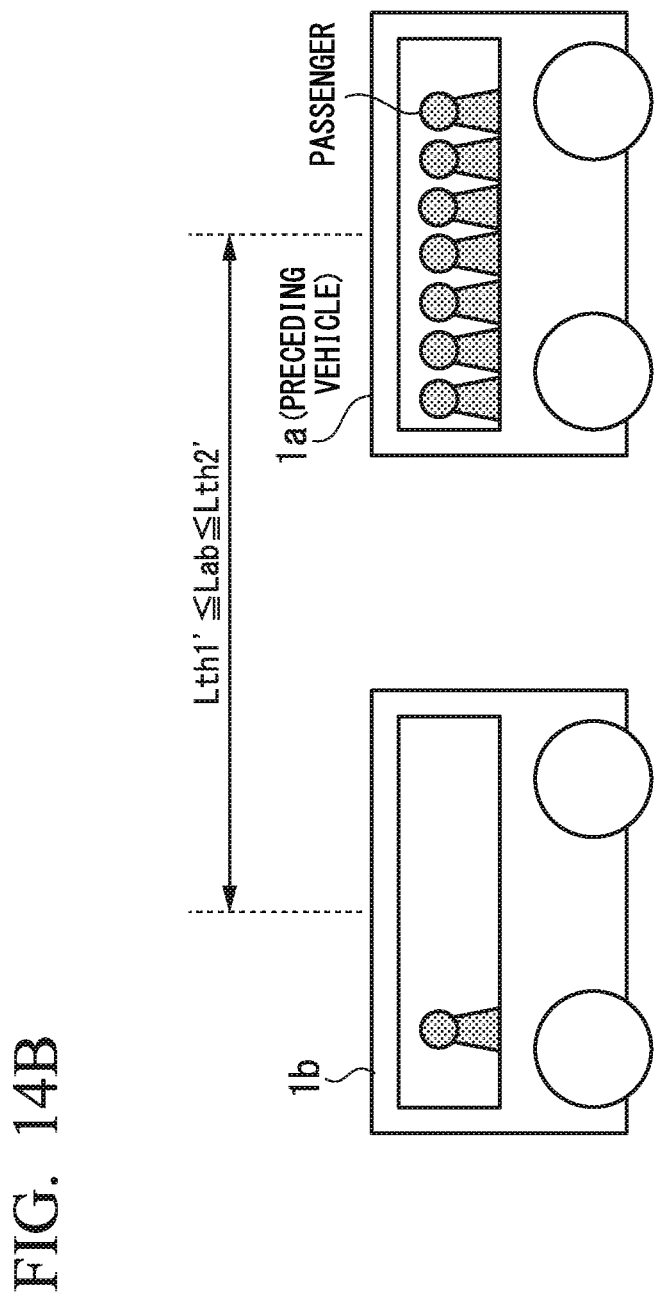
FIG. 14B is a second diagram illustrating the process performed by the evaluation unit according to the third embodiment of the present invention.

FIG. 14A and FIG. 14B are first and second diagrams illustrating the process performed by the evaluation unit according to the third embodiment of the present invention.

The evaluation unit 602 of the operating management apparatus 600 according to the embodiment evaluates the relative operating states based on the vehicle occupancy information which is acquired by the vehicle occupancy information acquisition unit 607 and the vehicle interval which is calculated by the vehicle interval computing unit 601. Specifically, the evaluation reference setting unit 602a according to the embodiment changes the values of the lower-limit vehicle interval value Lth1 and the upper-limit vehicle interval value Lth2 based on the vehicle occupancy information which is acquired by the vehicle occupancy information acquisition unit 607.

For example, as illustrated in FIG. 14A, when the difference in the number of passengers between the preceding vehicle 1a and the subsequent vehicle 1b is small and substantially the same, the evaluation reference setting unit 602a performs evaluation by setting the predetermined lower-limit vehicle interval value Lth1 and the upper-limit vehicle interval value Lth2.

In contrast, as illustrated in FIG. 14B, in a case of an operating state in which the number of passengers pa of the preceding vehicle 1a is far larger than the number of passengers pb of the subsequent vehicle 1b, the evaluation reference setting unit 602a detects that the difference between the number of passengers pa and the number of passengers pb is larger than the predetermined vehicle occupancy difference threshold pth. Further, the evaluation reference setting unit 602a sets the lower-limit vehicle interval value Lth1 which is set in the operating state of FIG. 14A, the lower-limit vehicle interval value Lth1 which is reduced rather than the upper-limit vehicle interval value Lth2, and the upper-limit vehicle interval value Lth2'. In other words, the driver of the subsequent vehicle (vehicle 1b) does not try to narrow the vehicle interval with the preceding vehicle even though large difference occurs in the number of passengers from the preceding vehicle (vehicle 1a), the evaluation unit 602 performs a process of decreasing the driver evaluation score of the subsequent vehicle (vehicle 1b).

In addition, at the same time, the driving instruction output unit 603 transmits the driving instruction information to increase the speed to the subsequent vehicle (vehicle 1b) based on the evaluation result for the operating state, and urges the drive further narrow the vehicle interval Lab.

Generally, when the number of getting-in persons of one vehicle (vehicle 1a) increases, it takes time for passengers to move to the exit or passengers who try to get on by force rarely get in, with the result that departure time is delayed, and thus driving is gradually delayed. That is, as long as the delayed vehicle (vehicle 1a) tries to take users on board in a congested vehicle, the imbalance of the number of getting-in persons is not corrected. As a result, the interval with the succeeding vehicle (vehicle 1b) is narrowed.

Here, when the subsequent vehicle (vehicle 1b) continuously travels on the back side of the congested preceding vehicle (vehicle 1a) while maintaining a short vehicle interval Lab, the driver of the preceding vehicle (vehicle 1a) can induce a user who tries to get in at a bus stop to use the subsequent vehicle (vehicle 1b). That is, when the vehicle 1a exceeds the predetermined fixed number reference, the vehicle 1a refuses the getting-in of a new user and urges the user to get in the succeeding vehicle (vehicle 1b). At this time, if the succeeding vehicle (vehicle 1b) rapidly arrives at a short vehicle interval, dissatisfaction of the user does not occur.

If so, the user chooses and gets in the subsequent vehicle (vehicle 1b) in which the number of passengers is small, with the result that the vehicle occupancy of the vehicles 1a, 1b, . . . are uniformed, and thus the whole operating states are improved.

In addition, in this case, the driving instruction output unit 603 may transmit a driving instruction to increase speed to the notification unit 200 of the vehicle 1b, and may transmit an instruction to induce a user who tries to get in to get in a subsequent vehicle to the notification unit 200 of the vehicle 1a based on the results of evaluation performed by the evaluation unit 602. Therefore, the driver of the preceding vehicle can accurately perceive timing in which inducement to the subsequent vehicle is performed.

Figure 15:
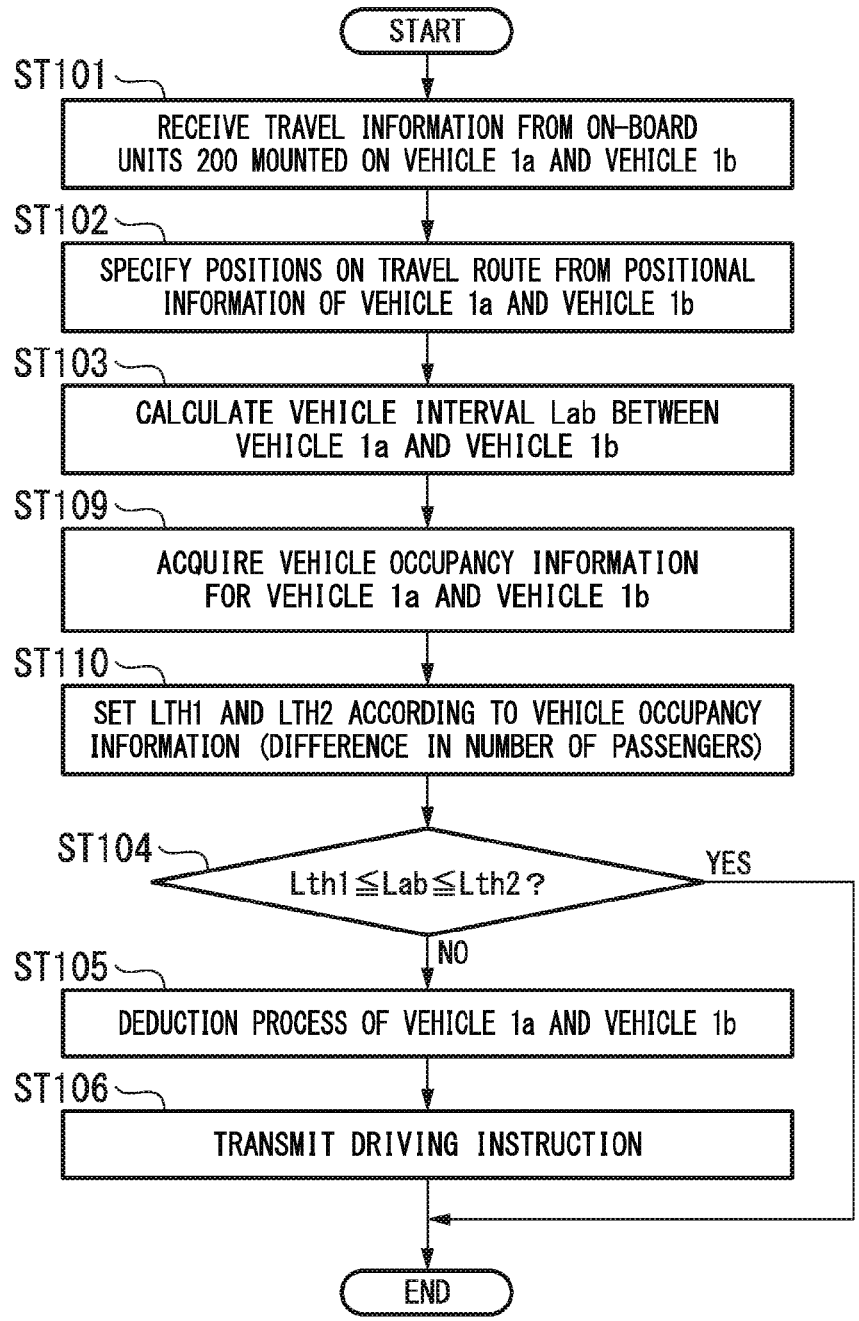
FIG. 15 is a flowchart illustrating the flow of a process performed by the operating management apparatus according to the third embodiment of the present invention.

FIG. 15 is a flowchart illustrating the flow of the process performed by the operating management apparatus according to the third embodiment of the present invention.

In the drawing, the same reference symbols are attached to the same process steps as in the flow of the process (FIG. 7) performed by the operating management apparatus 600 according to the first embodiment, and the description thereof will not be repeated.

In the operating management apparatus 600 according to the embodiment, after the processes (steps ST101 to 103) of the vehicle interval computing unit 601 are performed, the vehicle occupancy information acquisition unit 607 first acquires passenger vehicle occupancy information for the vehicles 1a and 1b from the vehicle occupancy monitoring server 500 (step ST109).

Subsequently, the evaluation reference setting unit 602a sets the values of the lower-limit vehicle interval value Lth1 and the upper-limit vehicle interval value Lth2 in order to determine the vehicle interval based on the vehicle occupancy information acquired by the vehicle occupancy information acquisition unit 607 (step ST110). Specifically, as described with reference to FIGS. 14A and 14B, when the difference between the number of passengers pa and the number of passengers pb is larger than the predetermined vehicle occupancy difference threshold pth, the evaluation reference setting unit 602a sets the values of the lower-limit vehicle interval value Lth1 and the upper-limit vehicle interval value Lth2 to values which are reduced compared to normal time.

Further, evaluation unit 602 and the driving instruction output unit 603 performs each of the process steps in processes of steps ST104 to 106 on the vehicles 1a and 1b based on the lower-limit vehicle interval value Lth1 and the upper-limit vehicle interval value Lth2 which are set in step ST110.

The operating management apparatus 600 performs the same processes on the vehicle intervals Lbc, Lcd, . . . between the other vehicles 1b, 1c, 1d, . . . .

Hereinabove, the bus operating management system according to the third embodiment of the present invention performs induction such that the vehicle interval between vehicles where the difference occurs becomes narrower according to the difference in the number of passengers of the vehicles 1a, 1b, . . . . Therefore, when difference, which is equal to or larger than a fixed value, occurs in the number of passengers from other adjacent vehicles, it is possible to cause the drivers of the vehicles 1a, 1b, . . . to narrow the vehicle intervals and to drive such that the number of passengers for each of the vehicles 1a, 1b, . . . is uniform.

Fourth Embodiment

Subsequently, an example of a bus operating management system according to a fourth embodiment of the present invention will be described with reference to the accompanying drawings.

A schematic diagram illustrating the example of the bus operating management according to the fourth embodiment of the present invention is the same as in the first embodiment, and thus the schematic diagram is not shown.

Figure 16:
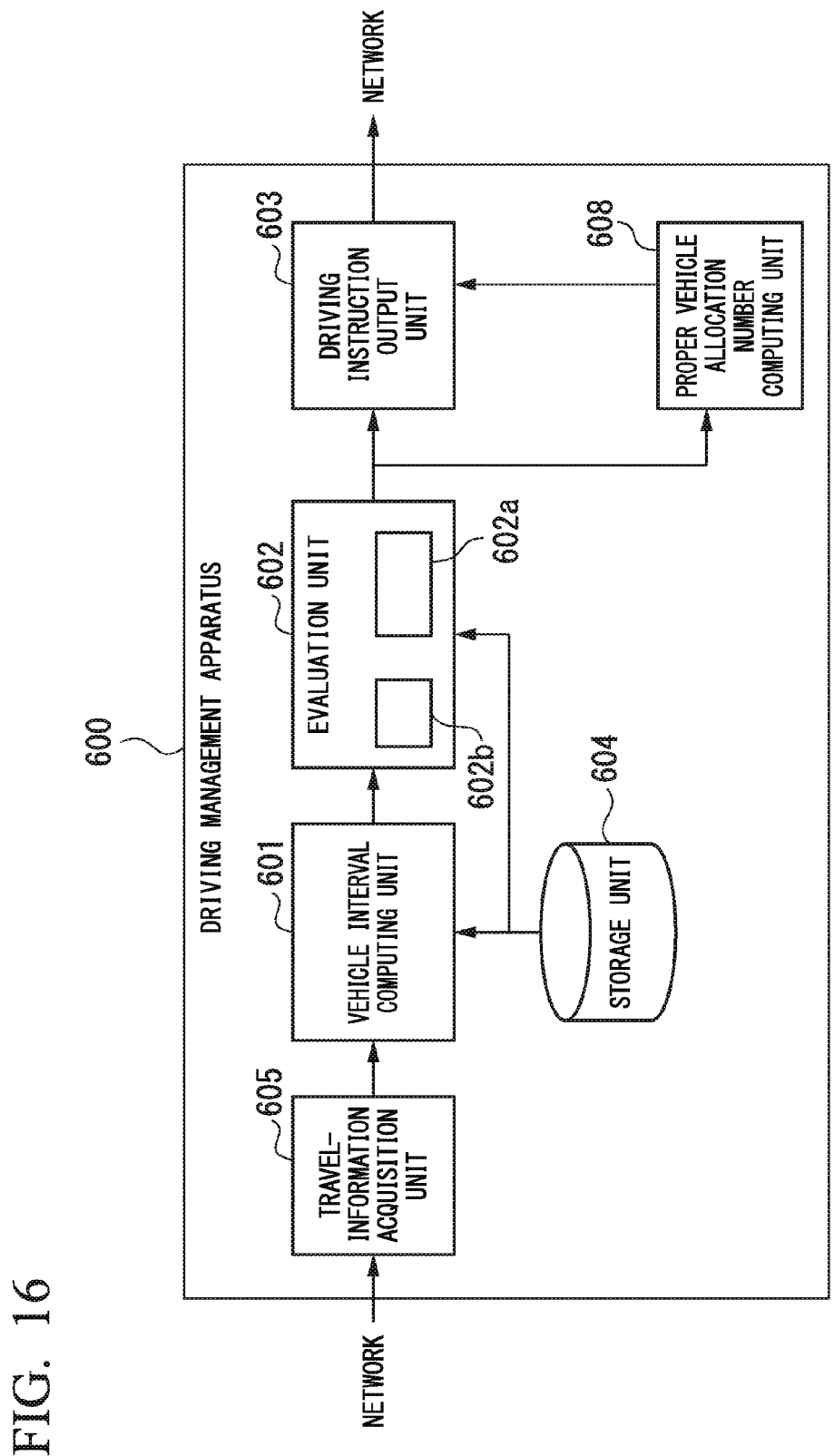
FIG. 16 is a block diagram illustrating an example of each configuration of an operating management apparatus according to a fourth embodiment of the present invention.

FIG. 16 is a block diagram illustrating an example of each configuration of the operating management apparatus according to a fourth embodiment of the present invention.

As illustrated in FIG. 16, the operating management apparatus 600 according to the embodiment includes a vehicle interval computing unit 601, an evaluation unit 602, a driving instruction output unit 603, a storage unit 604, a travel-information acquisition unit 605, and a proper vehicle allocation number computing unit 608.

Here, the vehicle interval computing unit 601, the storage unit 604, and the travel-information acquisition unit 605 have the same functional configurations as the first embodiment. Therefore, the description thereof will not be repeated.

The proper vehicle allocation number computing unit 608 determines proper vehicle allocation numbers on a route through which the vehicles 1a, 1b, . . . travel based on the result of evaluation performed by the evaluation unit 602. Specifically, when there is a section in which the vehicle interval is not proper throughout a plurality of vehicles, the proper vehicle allocation number computing unit 608 performs a process of calculating vehicle allocation numbers (proper vehicle allocation numbers) in order to make the vehicle interval in the section proper.

The facts that operating management apparatus 600 according to the embodiment includes the proper vehicle allocation number computing unit 608 and the driving instruction output unit 603 transmits the driving instruction to the vehicles 1a, 1b, . . . based on proper vehicle allocation numbers information acquired by the proper vehicle allocation number computing unit 608 are different from the first to third embodiments.

Figure 17:
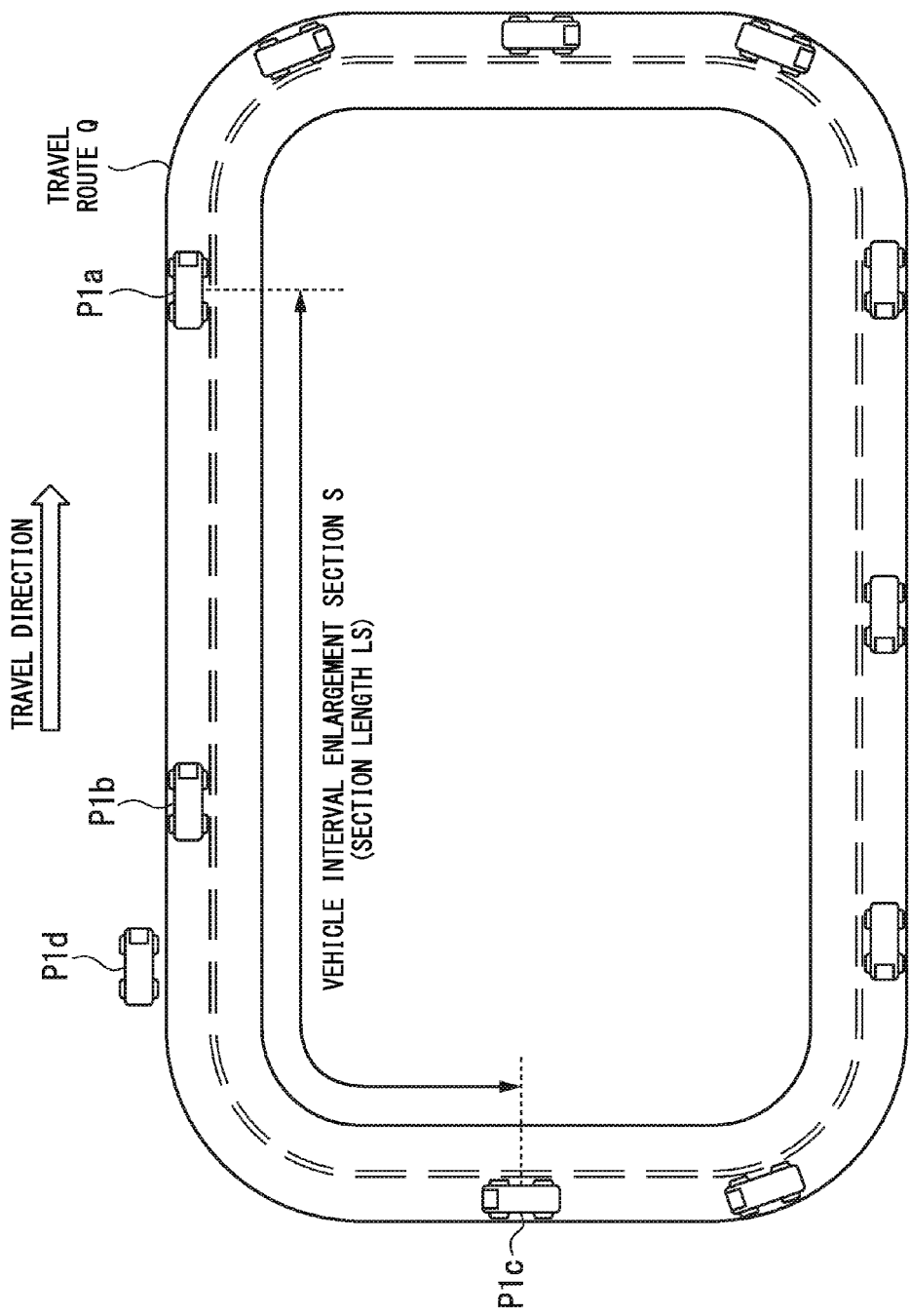
FIG. 17 is a diagram illustrating a process performed by a proper vehicle allocation number computing unit according to the fourth embodiment of the present invention.

FIG. 17 is a diagram illustrating a process performed by the proper vehicle allocation number computing unit according to the fourth embodiment of the present invention.

For example, it is assumed that three vehicles 1a, 1b, and 1c are traveling in a certain section on the travel route Q and a vehicle 1d is in a standby mode. In this case, the vehicle interval computing unit 601 specifies travel positions P1a, P1b, P1c, and P1d on the travel route Q based on the positional information received from the vehicles 1a, 1b, 1c, and 1d, calculates the vehicle intervals Lab and Lbc of the traveling vehicles 1a, 1b, and 1c, and outputs the vehicle intervals Lab and Lbc to the evaluation unit 602.

Here, it is assumed that both the vehicle intervals Lab and Lbc are far larger than the proper vehicle interval. At this time, the evaluation unit 602 determines that both the vehicle intervals Lab and Lbc is larger than the upper-limit vehicle interval value Lth2, and performs a process of lowering the evaluation of the drivers of the vehicles 1a, 1b, and 1c.

In contrast, the proper vehicle allocation number computing unit 608 specifies the section length LS of a vehicle interval enlargement section S that is a section in which the vehicles 1a, 1b, and 1c having vehicle intervals larger than the proper vehicle interval are traveling based on the results of evaluation performed by the evaluation unit 602 and positional information which indicates the travel positions P1a, P1b, and P1c (FIG. 17). Further, the proper vehicle allocation number computing unit 608 calculates the vehicle allocation numbers which cause the vehicle intervals to be proper in the vehicle interval enlargement section S based on the section length LS of the vehicle interval enlargement section S.

For example, it is assumed that the proper vehicle allocation number computing unit 608 calculates "2" as the proper vehicle allocation numbers of the vehicle interval enlargement section S (between the vehicle 1a and the vehicle 1c) as a result of performing a computing process of dividing the section length LS of the vehicle interval enlargement section S by a prescribed predetermined proper vehicle interval Lref (Lref is a numerical value which satisfies Lth1≤Lref≤Lth2). At this time, the driving instruction output unit 603 performs a process of transmitting a moving instruction to the vehicle 1d in the standby mode (FIG. 17) by taking the fact that the vehicle allocation numbers in the vehicle interval enlargement section S at a current time point are 1 and the proper vehicle allocation numbers calculated by the proper vehicle allocation number computing unit 608 are 2.

Therefore, the vehicle 1d, which is on standby in the vehicle interval enlargement section S, joins driving, and thus the vehicle allocation numbers in the vehicle interval enlargement section S increase by 1. As a result, the vehicle interval, which is excessively opened in the vehicle interval enlargement section S, is narrowed and approaches the proper vehicle interval.

In this case, in the first embodiment, it is possible to more rapidly adjust the vehicle interval in the vehicle interval enlargement section S to the proper interval compared to a case in which the driving instruction output unit 603 transmits a driving instruction to accelerate the vehicles 1b and 1c and narrow the vehicle intervals Lab and Lbc.

In addition, contrary to the example, the proper vehicle allocation number computing unit 608 calculates the proper vehicle allocation numbers in a section (vehicle interval reduction section S') in which the vehicle intervals are reduced throughout the plurality of vehicles. Further, in this case, the driving instruction output unit 603 transmits an instruction to stop driving and stand by to any one of the vehicles 1a, 1b, . . . which are traveling the vehicle interval reduction section S' such that the vehicle allocation numbers in the vehicle interval reduction section S' become the proper vehicle allocation numbers. As a result, the vehicle intervals which are narrow in the vehicle interval reduction section S' are widened and approach the proper vehicle interval.

Figure 18:
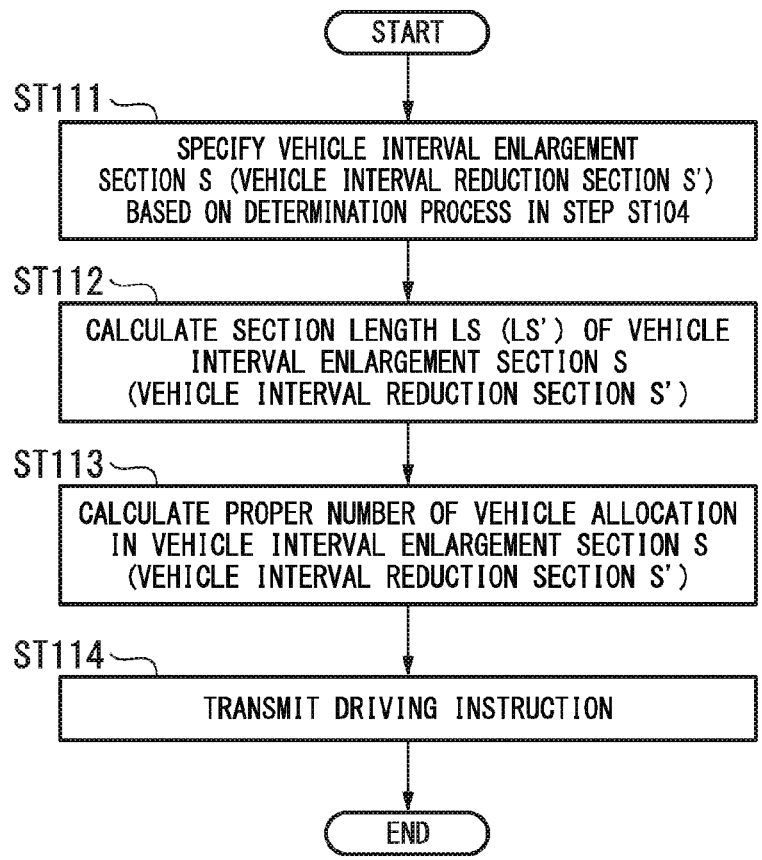
FIG. 18 is a flowchart illustrating the flow of a process performed by the operating management apparatus according to the fourth embodiment of the present invention.

FIG. 18 is a flowchart illustrating the flow of the process performed by the operating management apparatus according to the fourth embodiment of the present invention.

As an example, the flow of the process is described as a process which is subsequently performed after the operating management apparatus 600 performs the flow of the process illustrated in FIG. 7 according to the first embodiment on the entire vehicles 1a, 1b, . . . .

After the evaluation unit 602 performs the determination process in step ST104 on the whole vehicles 1a, 1b, . . . , the proper vehicle allocation number computing unit 608 specifies the vehicle interval enlargement section S (FIG. 17) by extracting a fact that a plurality of continuous vehicle intervals L are larger than the upper-limit interval value Lth2 based on the result of the evaluation (step ST111).

Subsequently, the proper vehicle allocation number computing unit 608 calculates the section length LS of the vehicle interval enlargement section S, which is specified in step ST111 (step ST112). Specifically, the proper vehicle allocation number computing unit 608 calculates the section length LS of the vehicle interval enlargement section S based on the positional information of the vehicle 1a which is positioned at the head of the vehicle interval enlargement section S and the vehicle 1c which is positioned at the tail thereof.

Further, the proper vehicle allocation number computing unit 608 calculates the proper vehicle allocation numbers by performing the computing process of dividing the section length LS by the predetermined proper vehicle interval Lref (step ST113).

Further, when the proper vehicle allocation numbers, which are calculated by the proper vehicle allocation number computing unit 608 in step ST113, are acquired, the driving instruction output unit 603 transmits a driving instruction (moving instruction) to start driving to the vehicles 1a, 1b, . . . in a standby mode such that the allocation numbers for allocation in the vehicle interval enlargement section S becomes the proper vehicle allocation numbers (step ST114).

The proper vehicle allocation number computing unit 608 may specify the vehicle interval reduction section S' by extracting the fact that the plurality of continuous vehicle intervals L are less than the to giver-limit vehicle interval value Lth1 in step ST111. In this case, the driving instruction output unit 603 transmits a driving instruction (standby instruction) to stop driving to the vehicles 1a, 1b, . . . , which are traveling the vehicle interval reduction section S', such that the allocation numbers for allocation in the vehicle interval reduction section S' becomes the proper vehicle allocation numbers in step ST114.

Hereinabove, when there is a section where the vehicle interval is enlarged or reduced throughout the plurality of vehicles, the bus operating management system according to the fourth embodiment of the present invention calculates the proper vehicle allocation numbers in the section, and transmits a driving instruction to move or standby to the vehicles 1a, 1b, . . . such that the vehicle allocation numbers become the proper vehicle allocation numbers. In this manner, when the vehicle intervals are deviated from the proper intervals throughout the plurality of vehicles, the bus operating management system can more rapidly restore the proper vehicle intervals.

The operating management systems according to the above-described first to fourth embodiments may be used in an aspect which includes part or all of the functions described in the embodiments. For example, the operating management apparatus 600 according to another embodiment may include any two or more of the traffic jam information acquisition unit 606, the vehicle occupancy information acquisition unit 607, and the proper vehicle allocation number computing unit 608 at the same time.

Processes may be performed by recording a program for realizing the function of the operating management apparatus 600 according to the present invention in a computer readable recording medium, and causing a computer system to read and run the program recorded in the recording medium. Meanwhile, here, the "computer system" includes hardware such as an OS or peripherals. In addition, the "computer system" includes a WWW system provided with homepage provision environment (or display environment). In addition, the "computer readable recording medium" refers to a portable medium, such as a flexible disk, a magneto-optical disk, a ROM, or a CD-ROM, and a storage apparatus, such as a hard disk, which is embedded in the computer system. Further, the "computer readable recording medium" includes a medium which maintains a fixed time program like a volatile memory (RAM) in the computer system which functions as a server or a client when a program is transmitted through a network such as the Internet or a communication line such as a telephone line.

In addition, the program may be transmitted to another computer system from a computer system, which stores the program in a storage apparatus or the like, through a transmission medium or waves transmitted in the transmission medium. Here, the "transmission medium" which transmits the program refers to a medium which has a function of transmitting information like a network (communication network), such as the Internet, or a communication line such as a telephone line. In addition, the program may realize a part of the above-described function. Further, the program may be a so-called difference file (difference program) which can realize the above-described function through combination with a program which is already recorded in the computer system.

Hereinabove, although some embodiments of the present invention are described, the embodiments are presented as examples and do not limit the scope of the invention. The embodiments can be realized using other various forms, and various omission, replacement, and modification are possible without departing from the gist of the invention. The embodiments and the modifications thereof are included in the scope and gist of the invention and included in the invention disclosed in claims and the equivalents thereof.

INDUSTRIAL APPLICABILITY

According to the above-described control apparatus and the control method, it is possible to readily stabilize variation in pressure when rapid load variation occurs in a load apparatus.

REFERENCE SIGNS LIST 1a, 1b, 1c, 1d vehicle
100 on-board unit
101 satellite signal reception unit
102 position detection unit
103 storage unit
104 travel state detection unit
105 travel state sensor
106 communication unit
200 notification unit
500 vehicle occupancy monitoring server
600 operating management apparatus
601 vehicle interval computing unit
602 evaluation unit
602a evaluation reference setting unit
602b evaluation table
602c evaluation object specification unit
603 driving instruction output unit
604 storage unit
605 travel-information acquisition unit
606 traffic jam information acquisition unit
607 vehicle occupancy information acquisition unit
608 proper vehicle allocation number computing unit
700 traffic information system

The invention claimed is:

1. An operating management system comprising:
on-board units that are to be mounted on a plurality of vehicles and are configured to be capable of acquiring travel information which includes positional information on each vehicle; and
an operating management apparatus that includes
a travel-information acquisition unit which acquires the travel information from each of the on-board units of the plurality of vehicles, and
an evaluation unit which evaluates a driving technique of each driver of the vehicles, based on relative operating states regarding the plurality of vehicles specified based on the travel information and proper operating states predetermined per a location or section on a travel route of the plurality of vehicles.

2. The operating management system according to claim 1, wherein the operating management apparatus further includes a driving instruction output unit which generates and outputs driving instruction information for driving instruction to each of the plurality of vehicles based on results of evaluation performed by the evaluation unit.

3. The operating management system according to claim 1,
wherein the operating management apparatus further includes a vehicle interval computing unit that calculates a vehicle interval between each of the plurality of vehicles and another adjacent vehicle based on the plurality of pieces of the positional information which is acquired by the on-board units mounted on the plurality of vehicles, and
wherein the evaluation unit evaluates the driving technique of each driver of the vehicles based on the vehicle interval.

4. The operating management system according to claim 3,
wherein the operating management apparatus further includes a traffic jam information acquisition unit that acquires traffic jam information about a route through which the plurality of vehicles travels, and
wherein the evaluation unit evaluates the driving technique of each driver of the vehicles based on the traffic jam information and the vehicle interval.

5. The operating management system according to claim 3,
wherein the operating management apparatus further includes a vehicle occupancy information acquisition unit that acquires vehicle occupancy information which indicates the number of passengers of each of the plurality of vehicles, and
wherein the evaluation unit evaluates the driving technique of each driver of the vehicles based on the vehicle occupancy information and the vehicle interval.

6. The operating management system according to claim 1,
wherein the operating management apparatus further includes a proper vehicle allocation number computing unit that calculates proper vehicle allocation numbers such that vehicle intervals between the plurality of vehicles on the travel route become a proper interval based on results of evaluations performed by the evaluation unit.

7. An operating management method comprising:
acquiring travel information by a travel-information acquisition unit from on-board units that are each mounted on a plurality of vehicles and are configured to be capable of acquiring the travel information which includes positional information of the vehicles; and
evaluating a driving technique of each driver of the vehicles by an evaluation unit, based on relative operating states for the plurality of vehicles specified based on the travel information and proper operating states predetermined per a location or section on a travel route of the plurality of vehicles.

8. A non-transitory computer readable medium that stores a program causing a computer of an operating management apparatus to function:
acquiring travel information from on-board units that are each mounted on a plurality of vehicles and are configured to be capable of acquiring the travel information which includes positional information on each vehicle; and
evaluating a driving technique of each driver of the vehicles, based on relative operating states for the plurality of vehicles specified based on the travel information and proper operating states predetermined per a location or section on a travel route of the plurality of vehicles.

9. The operating management system according to claim 3, wherein the evaluation unit is configured to evaluate whether the driver is maintaining at least one of a vehicle interval between the vehicle and a preceding vehicle and a vehicle interval between the vehicle and a subsequent vehicle within a predetermined appropriate vehicle interval.

10. The operating management system according to claim 9, wherein the evaluation unit is configured to evaluate whether the driver is maintaining the proper operating states when the vehicle intervals between the vehicle and the preceding vehicle and between the vehicle and the subsequent vehicle deviate from the predetermined appropriate vehicle intervals.

11. The operating management system according to claim 9, wherein the evaluation unit is configured to set the predetermined vehicle intervals according to the location or the section on the travel route of the plurality of vehicles.

* * * * *